US010481966B2

(12) United States Patent
Harutyunyan et al.

(10) Patent No.: US 10,481,966 B2
(45) Date of Patent: Nov. 19, 2019

(54) METHODS AND SYSTEMS TO PRIORITIZE ALERTS WITH QUANTIFICATION OF ALERT IMPACTS

(71) Applicant: VMware, Inc., Palo Alto, CA (US)

(72) Inventors: Ashot Nshan Harutyunyan, Yerevan (AM); Vardan Movsisyan, Yerevan (AM); Arnak Poghosyan, Yerevan (AM); Naira Movses Grigoryan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 199 days.

(21) Appl. No.: 15/604,460

(22) Filed: May 24, 2017

(65) Prior Publication Data

US 2018/0341566 A1 Nov. 29, 2018

(51) Int. Cl.
| | | |
|---|---|---|
| G06F 11/07 | (2006.01) | |
| G06F 11/30 | (2006.01) | |
| G06F 11/34 | (2006.01) | |
| G06F 11/32 | (2006.01) | |

(52) U.S. Cl.
CPC ...... *G06F 11/0781* (2013.01); *G06F 11/0766* (2013.01); *G06F 11/0793* (2013.01); *G06F 11/3006* (2013.01); *G06F 11/327* (2013.01); *G06F 11/3452* (2013.01); *G06F 11/3495* (2013.01); *G06F 2201/81* (2013.01); *G06F 2201/815* (2013.01); *G06F 2201/86* (2013.01)

(58) Field of Classification Search
CPC ............. G06F 11/3072; G06F 11/3006; G06F 11/3034; G06F 11/3495; G06F 11/327; G06F 11/0793; G06F 11/0781; G06F 11/0766
See application file for complete search history.

(56) References Cited

U.S. PATENT DOCUMENTS

| 10,268,534 B2 * | 4/2019 | Brown ................ G06F 11/0709 |
| 2010/0102982 A1 * | 4/2010 | Hoveida ............. G06F 11/3072 340/691.3 |

(Continued)

OTHER PUBLICATIONS

Marvasti, Mazda A. et al. An Anomaly Event Correlation Engine: Identifying Root Causes, Bottlenecks, and Black Swans in IT Environments. Vmware Technical Journal. 2013. VMWare, Inc. pp. 35-44.*

*Primary Examiner* — Paul Contino

(57) ABSTRACT

Methods and systems are directed to quantifying and prioritizing the impact of problems or changes in a computer system. Resources of a computer system are monitored by management tools. When a change occurs at a resource of a computer system or in log data generated by event sources of the computer system, one or more of the management tools generates an alert. The alert may be an alert that indicates a problem with the computer system resource or the alert may be an alert trigger identified in an event message of the log data. Methods described herein compute an impact factor that serves as a measure of the difference between event messages generated before the alert and event messages generated after the alert. The value of the impact factor associated with an alert may be used to quantitatively prioritize the alert and generate appropriate recommendations for responding to the alert.

21 Claims, 31 Drawing Sheets

(56) References Cited

U.S. PATENT DOCUMENTS

| | | | |
|---|---|---|---|
| 2011/0054334 A1* | 3/2011 | Fischell | A61B 5/0402 600/509 |
| 2011/0080294 A1* | 4/2011 | Tanishima | A61B 5/1455 340/573.1 |
| 2012/0163194 A1* | 6/2012 | Bertze | H04L 41/0654 370/242 |
| 2012/0254671 A1* | 10/2012 | Francisco | G06F 11/0709 714/48 |
| 2013/0097272 A1* | 4/2013 | Atkins | G06F 11/0709 709/207 |
| 2014/0215055 A1* | 7/2014 | Reynolds | H04L 43/022 709/224 |
| 2015/0066435 A1* | 3/2015 | Basu | H04Q 9/00 702/189 |
| 2015/0205696 A1* | 7/2015 | Hanckel | G06F 11/3476 714/45 |
| 2017/0004012 A1* | 1/2017 | Brown | G06F 9/5011 |
| 2017/0031741 A1* | 2/2017 | Seigel | G06F 11/079 |
| 2017/0126472 A1* | 5/2017 | Margalit | H04L 41/0604 |
| 2017/0163669 A1* | 6/2017 | Brown | H04L 63/1425 |
| 2017/0322120 A1* | 11/2017 | Wang | G01M 99/005 |
| 2017/0364402 A1* | 12/2017 | Chua | G06F 11/079 |
| 2018/0137001 A1* | 5/2018 | Zong | G06F 11/079 |
| 2018/0181883 A1* | 6/2018 | Ikeda | G06F 11/30 |
| 2018/0239658 A1* | 8/2018 | Whitner | G06F 11/004 |
| 2018/0276043 A1* | 9/2018 | Zions | G06F 11/3476 |
| 2018/0341566 A1* | 11/2018 | Harutyunyan | G06F 11/3072 |

* cited by examiner

```
log.write([$Time_date] [Thread-$X/$IP/INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
[$Time_date] Repair session $RS for range $range finished)
```

FIG. 12

```
[2015-03-10 23:43:36.859+0000] [Thread-1822496/127.0.0.1 INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
[2015-03-10 23:43:36,716] Repair session 51312720-c77e-11e4-ad72-4769d614a3f2 for range
(-6899937477723537626, -6896547230076663429) finished]
```

FIG. 13

```
     ┌1408   ┌1410                              ┌─1402
     ╱       ╱                                  ╱
2013-12-02T10:44:24.095Z li-qe-esx5.vmware.com Rhttpproxy:
[28959B90 verbose 'Proxy Req 46691'] Connected to          ──1404
localhost:8307──1412                      ╲─1406

2013-12-02T10:44:24.094Z li-qe-esx5.vmware.com Rhttpproxy:
[FFFC2B90 verbose 'Proxy Req 46691'] new proxy client
TCP (local-127.0.0.1:80, peer=127.0.0.1:50155)

2013-12-02T10:44:24.093Z li-qe-esx5.vmware.com Rhttpproxy:
[2889B90 verbose 'Proxy Req 46685'] The client closed the
stream, not unexpectedly.

Dec  2 18:48:29 strata-vc 2013-12-02T18:48:30.273Z
[7FA39448B700 info 'commonvpxLro' opID=1947d6f9]  [VpxLRO] -
FINISH task-internal-2163522 -- -- vim.SessionManager.logout -

2013-12-02T18:48:51.396Z strata-esx1.eng.vmware.com Vpxa:
[65B5AB90 verbose 'VpxaHalCnxHostagent' opID=WFU-ed393333]
[WaitForUpdatesDone] Completed callback 2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Starting next WaitForUpdates() call to
hostd 2013-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed 2013-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed
```

FIG. 14

| Reply Code | Reply Code Description |
|---|---|
| 1xx | |
| 101 | The server is unable to connect |
| 111 | Connection refused or inability to open an SMTP stream |
| 2xx | |
| 211 | System status |
| 214 | Help ready |
| 220 | Service ready |
| ⋮ | |
| 354 | Start mail input |
| 4xx | |
| 420 | Timeout connection problem |
| 421 | Service unavailable |
| 422 | Recipient's mailbox exceeded storage limit |
| 431 | Not enough space on the disk |
| 432 | Recipient's exchange server incoming mail queue has stopped |
| 441 | Recipient's server is not responding |
| ⋮ | |
| 5xx | |
| 500 | Syntax error |
| 501 | Syntax error |
| 502 | Command not implemented |
| 503 | Server has encountered bad sequence of commands |
| 504 | Command parameter is not implemented |
| 510 | Bad mail address |
| 512 | A DNS error |
| ⋮ | |

FIG. 19B

| Event Types | Count | Percent | Probability |
|---|---|---|---|
| v4_18ca9254 | 24 | 2.74 | 0.03 |
| v4_1a6ac047 | 1 | 0.11 | 0 |
| v4_28077ade | 1 | 0.11 | 0 |
| v4_2f6e41a2 | 25 | 2.85 | 0.03 |
| v4_36c81ef6 | 48 | 5.48 | 0.05 |
| v4_393c8071 | 175 | 19.98 | 0.2 |
| v4_59cd0174 | 25 | 2.85 | 0.03 |
| v4_681f6046 | 48 | 5.48 | 0.05 |
| v4_69475cc1 | 0 | 0 | 0 |
| v4_6dd466a5 | 25 | 2.85 | 0.03 |
| v4_71183f87 | 2 | 0.23 | 0 |
| v4_802bd0d4 | 100 | 11.42 | 0.11 |
| v4_87e0ca23 | 25 | 2.85 | 0.03 |
| v4_88de5e12 | 24 | 2.74 | 0.03 |
| v4_8ebbb638 | 25 | 2.85 | 0.03 |
| v4_94680e71 | 25 | 2.85 | 0.03 |
| v4_9d3e7bdd | 25 | 2.85 | 0.03 |
| v4_9fd2eafd | 33 | 3.77 | 0.04 |
| v4_a7f56e13 | 50 | 5.71 | 0.06 |
| v4_a8a71825 | 25 | 2.85 | 0.03 |
| v4_b610f232 | 24 | 2.74 | 0.03 |
| v4_b9100c8f | 48 | 5.48 | 0.05 |
| v4_bafd4270 | 25 | 2.85 | 0.03 |
| v4_bfebb8d | 48 | 5.48 | 0.05 |
| v4_f0533255 | 25 | 2.85 | 0.03 |

FIG. 25

| Event Types | Count | Probability |
|---|---|---|
| v4_18ca9254 | 24 | 0.0073 |
| v4_1a6ac047 | 1 | 0.0003 |
| v4_28077ade | 1 | 0.0003 |
| v4_2f6e41a2 | 28 | 0.0085 |
| v4_36c81ef6 | 48 | 0.0145 |
| v4_393c8071 | 196 | 0.0594 |
| v4_59cd0174 | 28 | 0.0085 |
| v4_681f6046 | 48 | 0.0145 |
| v4_69475cc1 | 91 | 0.0276 |
| v4_6dd466a5 | 28 | 0.0085 |
| v4_71183f87 | 2 | 0.0006 |
| v4_802bd0d4 | 1120 | 0.3393 |
| v4_87e0ca23 | 28 | 0.0085 |
| v4_88de5e12 | 24 | 0.0073 |
| v4_8ebbb638 | 28 | 0.0085 |
| v4_94680e71 | 28 | 0.0085 |
| v4_9d3e7bdd | 28 | 0.0085 |
| v4_9fd2eafd | 1290 | 0.3908 |
| v4_a7f56e13 | 56 | 0.017 |
| v4_a8a71825 | 28 | 0.0085 |
| v4_b610f232 | 24 | 0.0073 |
| v4_b9100c8f | 48 | 0.0145 |
| v4_bafd4270 | 28 | 0.0085 |
| v4_bfebb8d | 48 | 0.0145 |
| v4_f0533255 | 28 | 0.0085 |

FIG. 27

| Before the alert | | After the alert (5 min) | |
|---|---|---|---|
| HTTP Status Code | Rel. frequency | HTTP Status Code | Rel. frequency |
| 20x | 0.80 | 20x | 0.22 |
| 30x | 0.05 | 30x | 0.03 |
| 401 | 0.05 | 401 | 0.55 |
| 404 | 0.10 | 404 | 0.20 |

FIG. 29

METHODS AND SYSTEMS TO PRIORITIZE ALERTS WITH QUANTIFICATION OF ALERT IMPACTS

TECHNICAL FIELD

The present disclosure is directed to prioritizing alerts in a computing system.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies.

In recent years, management tools have been developed to monitor the performance and capacity of the numerous and various components of distributed computing systems and generate alerts that are used to notify administrators of problems or significant changes to the infrastructure, applications, and other anomalous behavior of system components. However, these management tools can generate multiple alerts with implications of noise and alert fatigue. In addition, the same alert may have different meanings in different environments. Currently, administrators speculate on how an alert may impact the health, risk, or efficiency of a distributed computing system based on previous experience with alerts generated by the management tools. As a result, evaluating the impact of problems to the distributed computing system prioritizing response to the various alert is not uncertain. Administrators seek methods to prioritizing the various types of alerts for optimal troubleshooting of the distributed computing infrastructure.

SUMMARY

Methods and systems described herein are directed quantifying and prioritizing the impact of problems or changes in a computer system. Resources of a computer system are monitored by management tools. When a change occurs at a resource of a computer system or in log data generated by event sources of the computer system, one or more of the management tools generates an alert. The alert may be an indication of a problem with the computer system resource. When an alert is generated an alert trigger may be identified in event messages generated by the event sources. An alert trigger may be a word, phrase, numerical value in an event message (e.g., HTTP status or SMTP reply code), type of the event message, quantity of certain event messages, or quantity of certain event types that leads to system problems and may trigger alerts. Methods described herein compute an impact factor that serves as a measure of the difference between event messages generated before the problem and event messages generated after the problem. The value of the impact factor associated with an alert may be used to quantitatively prioritize the alert and generate appropriate recommendations for responding to the alert.

DESCRIPTION OF THE DRAWINGS

FIG. 12 shows an example of a log write instruction.

FIG. 13 shows an example of an event message generated by a log write instruction.

FIG. 14 shows a small, eight-entry portion of an event log.

FIG. 19A-19B shows a table of HTTP status codes.

FIGS. 25-28 show an example of relative frequencies of event types distributions for pre-alert and post-alert event messages that change as a result of a simulated distributed dial of service attack on a server.

FIG. 29 shows relative frequency distributions of HTTP status code obtained from pre-alert and post-alert event messages.

DETAILED DESCRIPTION

Figure 1:
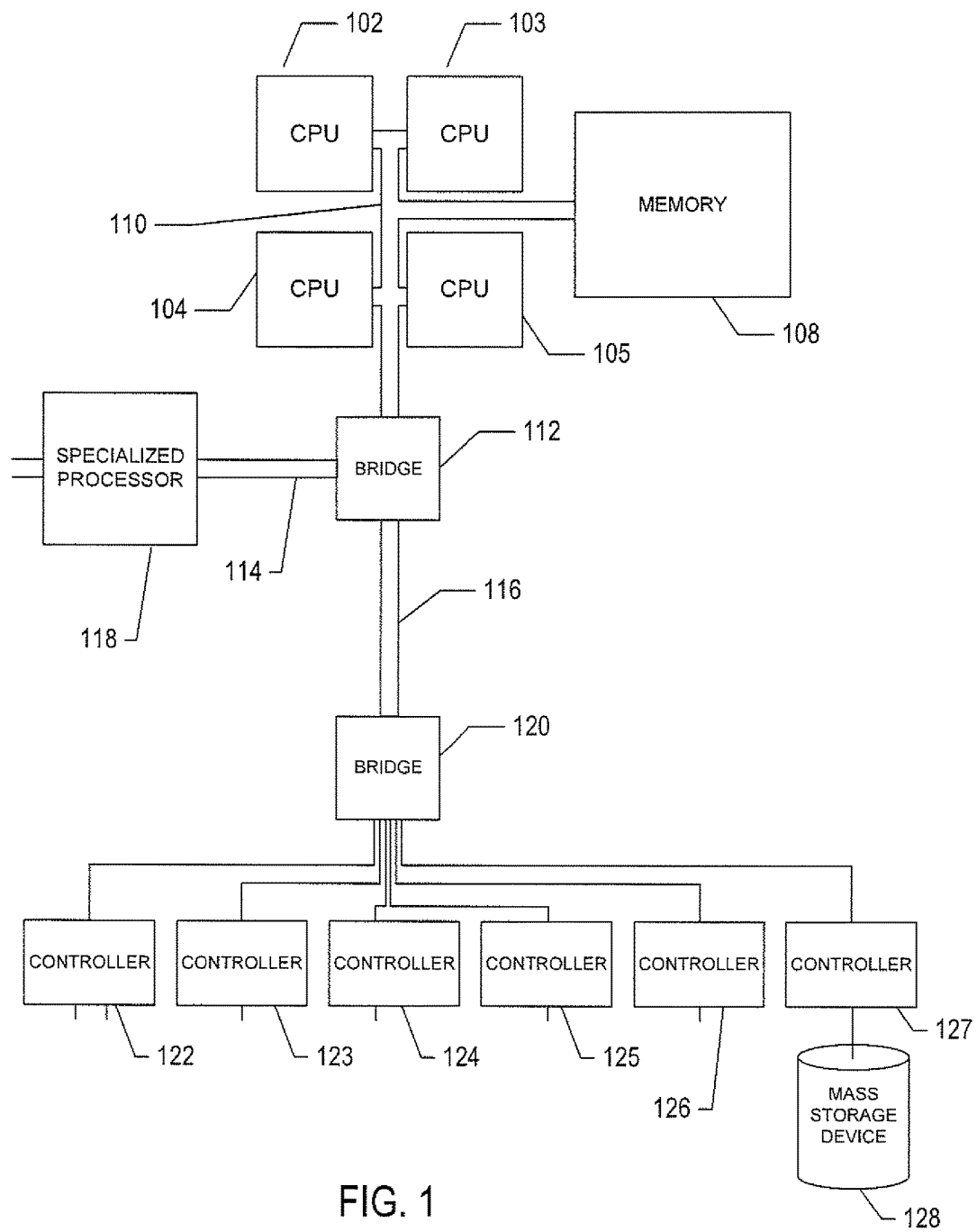
FIG. 1 shows a general architectural diagram for various types of computers.

This disclosure presents computational methods and systems to quantify and prioritize alerts in a computer system. In a first subsection, computer hardware, complex computational systems, and virtualization are described. Containers and containers supported by virtualization layers are described in a second section subsection. Methods and systems to quantify and prioritize alerts are described below in a third subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 shows a general architectural diagram for various types of computer system. Computer systems that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
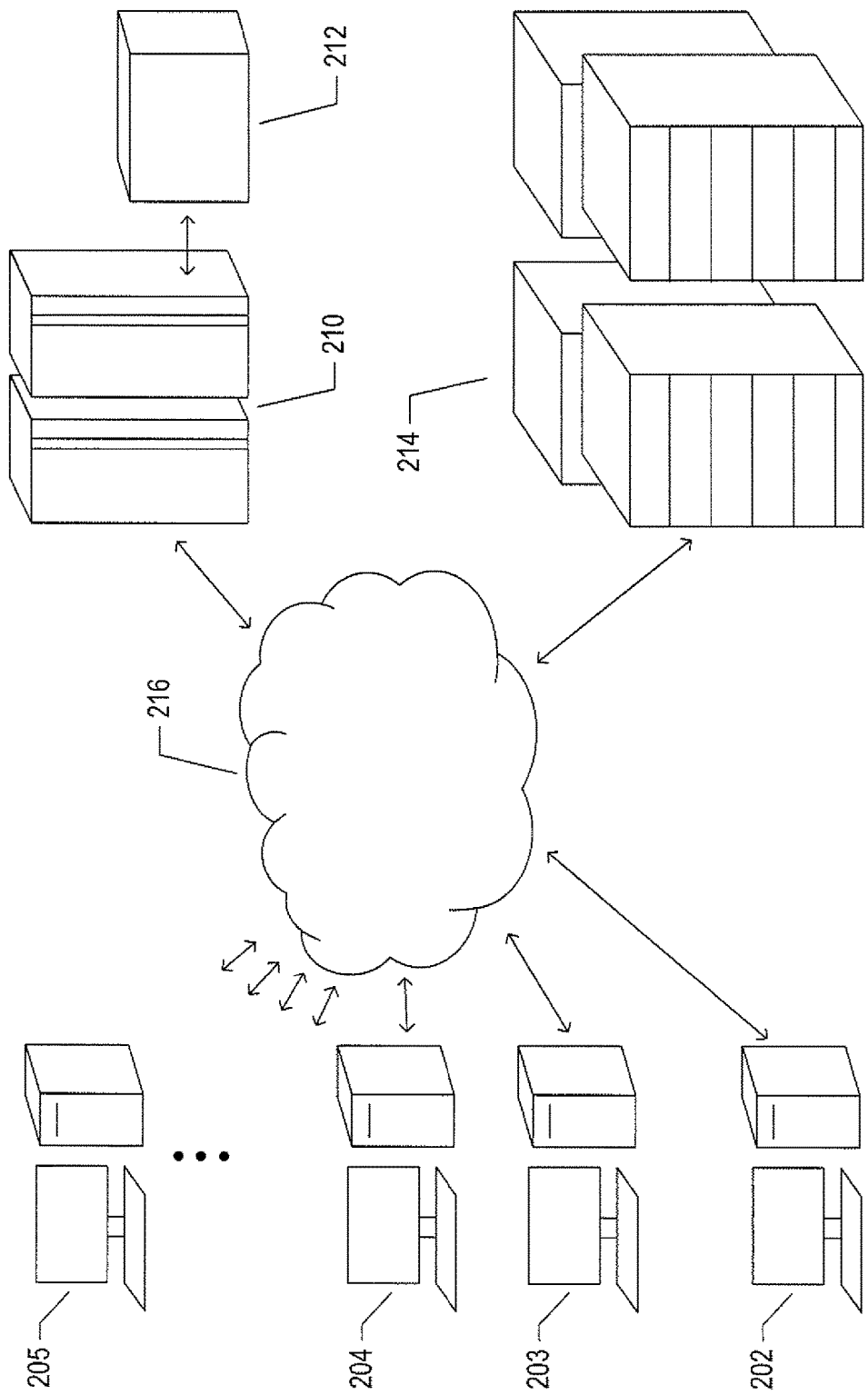
FIG. 2 shows an Internet-connected distributed computing system.

FIG. 2 shows an Internet-connected distributed computing system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
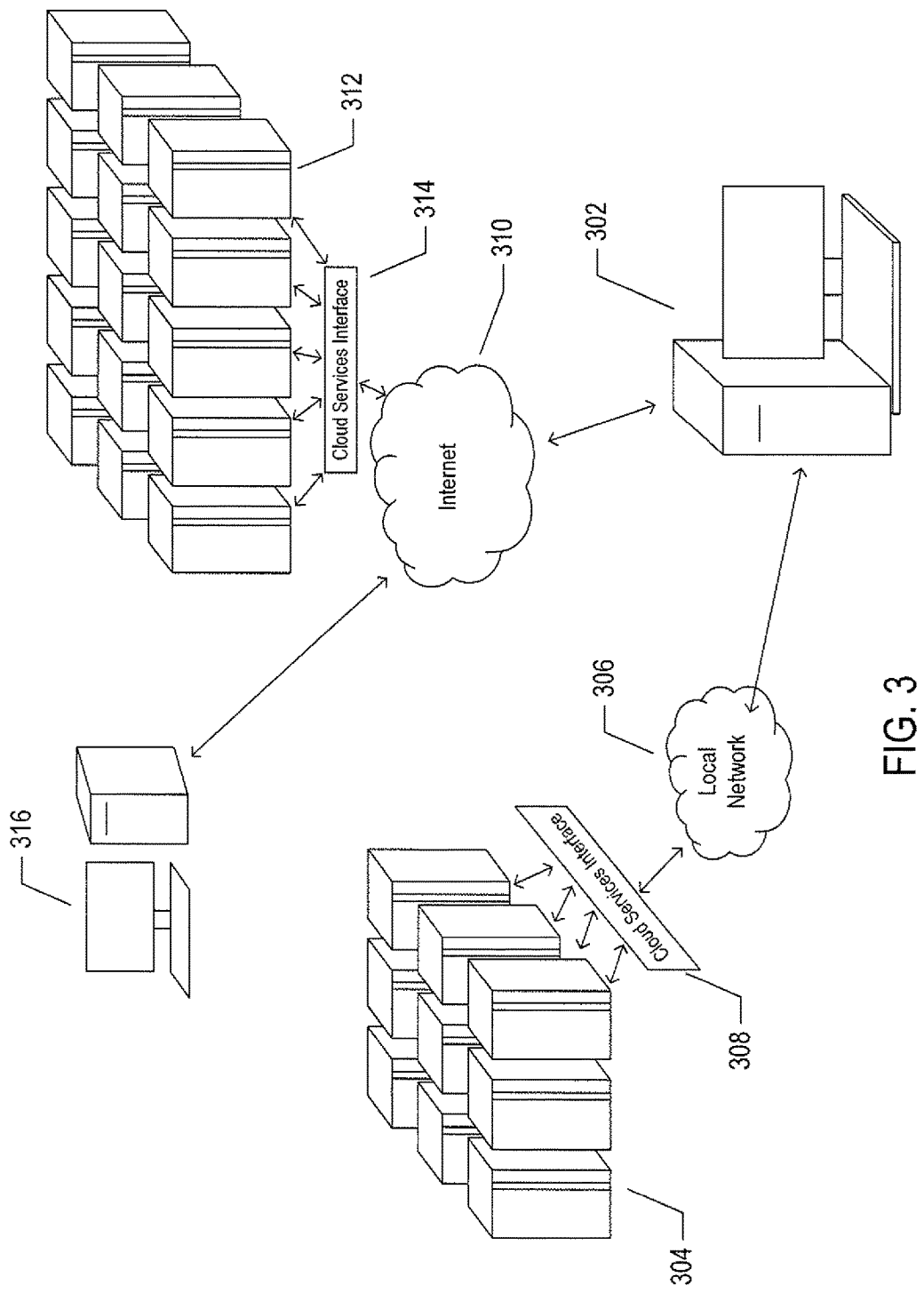
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities typically provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
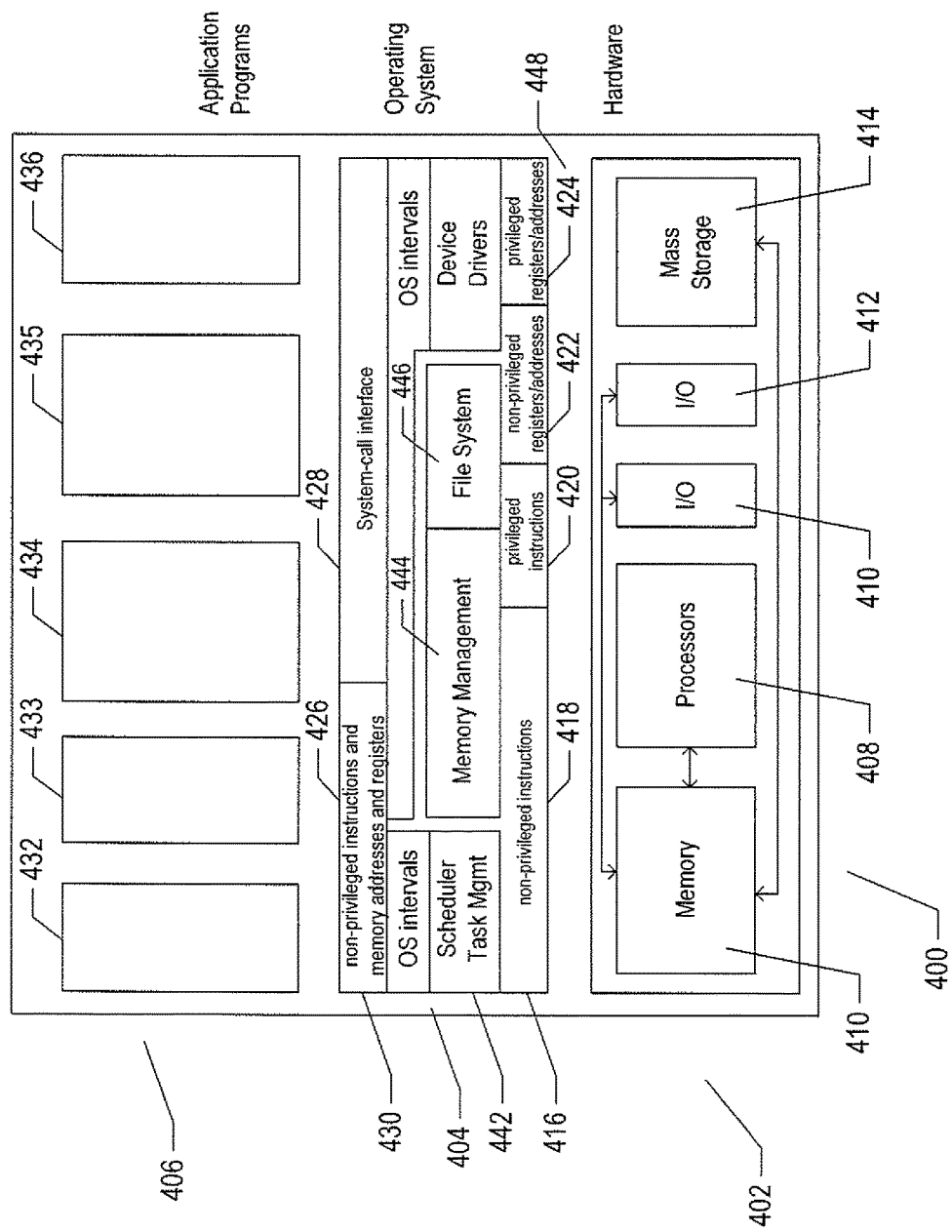
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various types of computer hardware. In many cases, popular application programs and computational systems are developed to run on only a subset of the available operating systems, and can therefore be executed within only a subset of the various types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computing system for high-availability, fault-tolerance, and load-balancing purposes. The problems are even greater in heterogeneous distributed computing systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
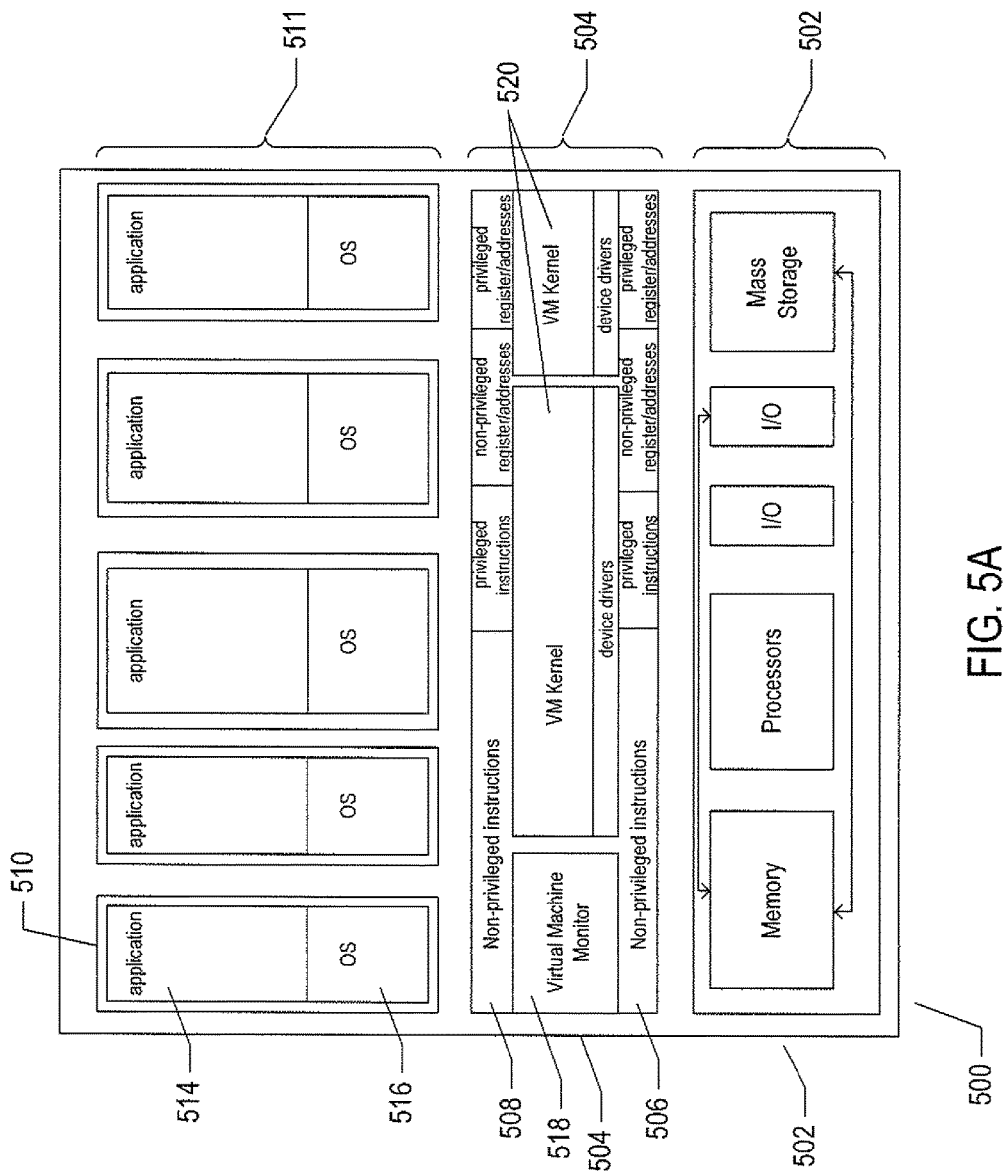
FIGS. 5A-5B show two types of virtual machine and virtual-machine execution environments.
Figure 5B:
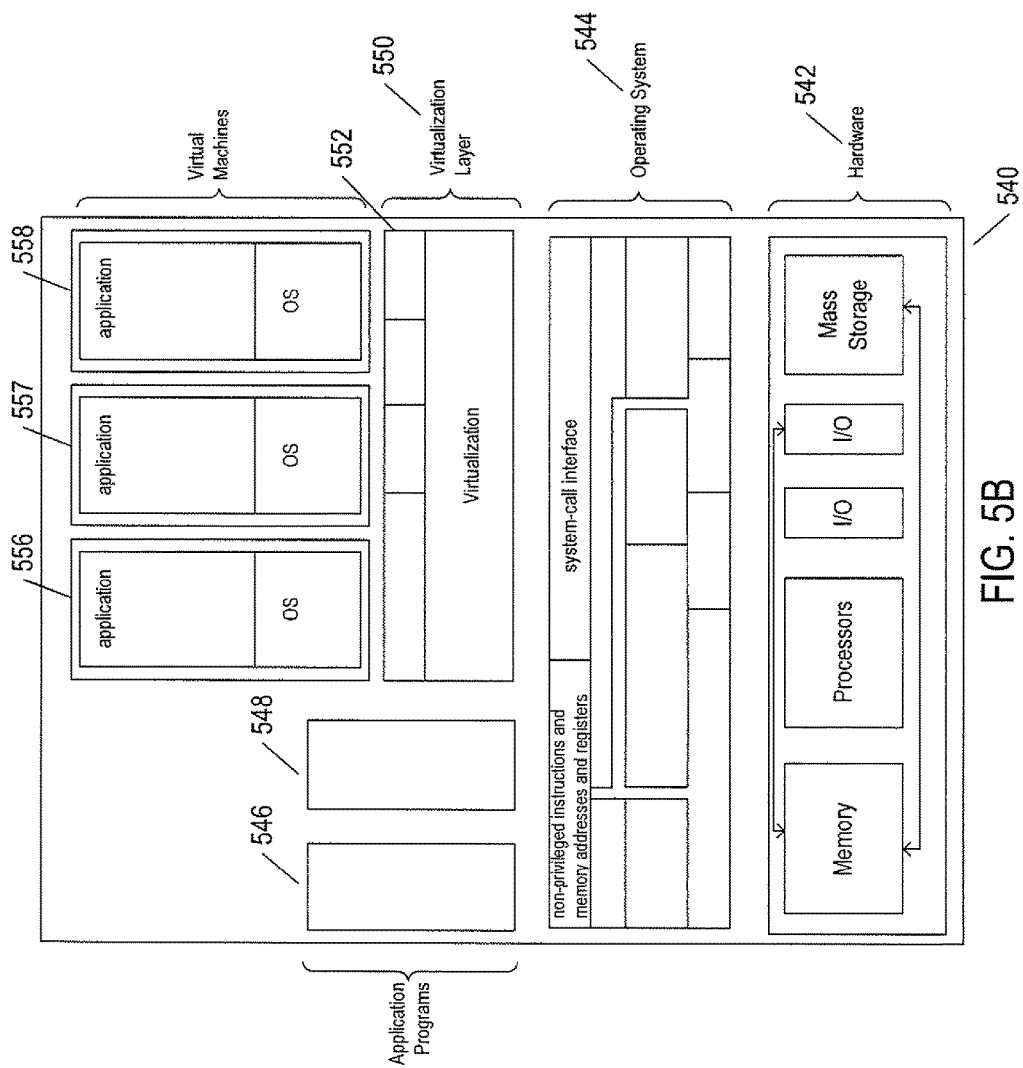

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. Figure 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in Figure 5A features a virtualization layer 504 that interfaces through a virtualization-layer/hardware-layer interface 506, equivalent to interface 416 in FIG. 4, to the hardware. The virtualization layer 504 provides a hardware-like interface to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer allows VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In Figure 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552 similar to the hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices.

They are as physical and tangible as any other component of a computer since, such as power supplies, controllers, processors, busses, and data-storage devices.

Containers and Containers Supported by Virtualization Layers

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

Figure 6:
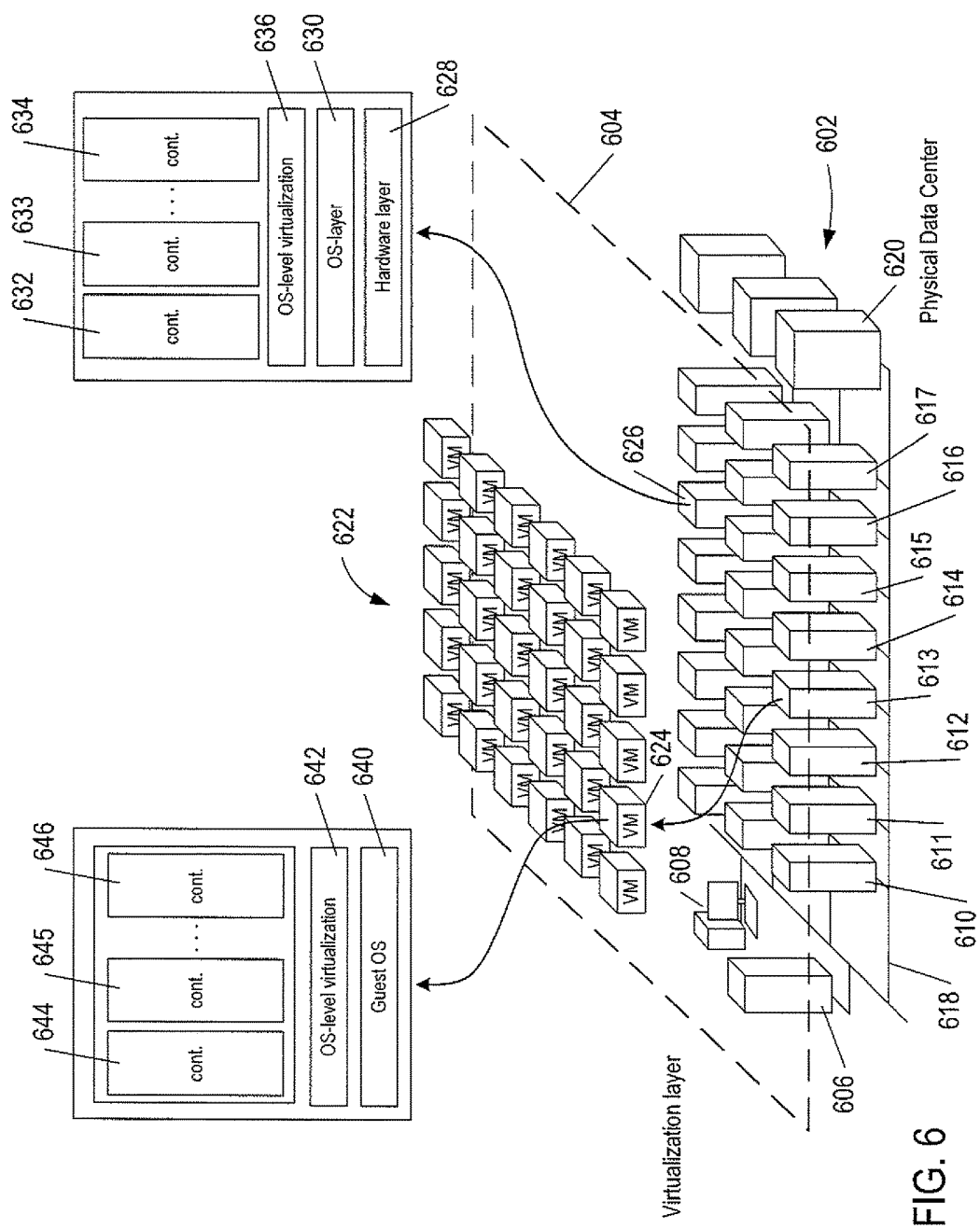
FIG. 6 shows an example of an open virtualization format package.

Another approach to virtualization, as also mentioned above, is referred to as operating-system-level virtualization ("OSL virtualization"). FIG. 6 shows two ways in which OSL virtualization may be implemented in a physical data center 602. In FIG. 6, the physical data center 602 is shown below a virtual-interface plane 604. The physical data center 602 comprises a virtual-data-center management server 606 and any of various computers, such as PCs 608, on which a virtual-data-center management interface may be displayed to system administrators and other users. The physical data center 600 additionally includes a number of computer systems, such as computer systems 610-617, that are coupled together by local area networks, such as local area network 618, that directly interconnects computer systems 610-617 and a mass-storage array 620. The physical data center 602 includes three local area networks that each directly interconnects a bank of eight computer systems and a mass-storage array. Certain computer systems have a virtualization layer that runs multiple VMs 622. For example, computer system 613 has a virtualization layer that is used to run VM 624. Certain VMs and computer systems may be used to host a number of containers. A computer system 626 has a hardware layer 628 and an operating system layer 630 that is shared by a number of containers 632-634 via an OSL virtualization layer 636 as described in greater detail below with reference to FIG. 7. Alternatively, the VM 624 has a guest operating system 640 and an OSL virtualization layer 642. The guest operating system 640 is shared by containers 644-646 via the OSL virtualization layer 642 as described in greater detail below with reference to FIG. 8.

While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files not included the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other resources provided by the operating system, without the overhead associated with resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 7:
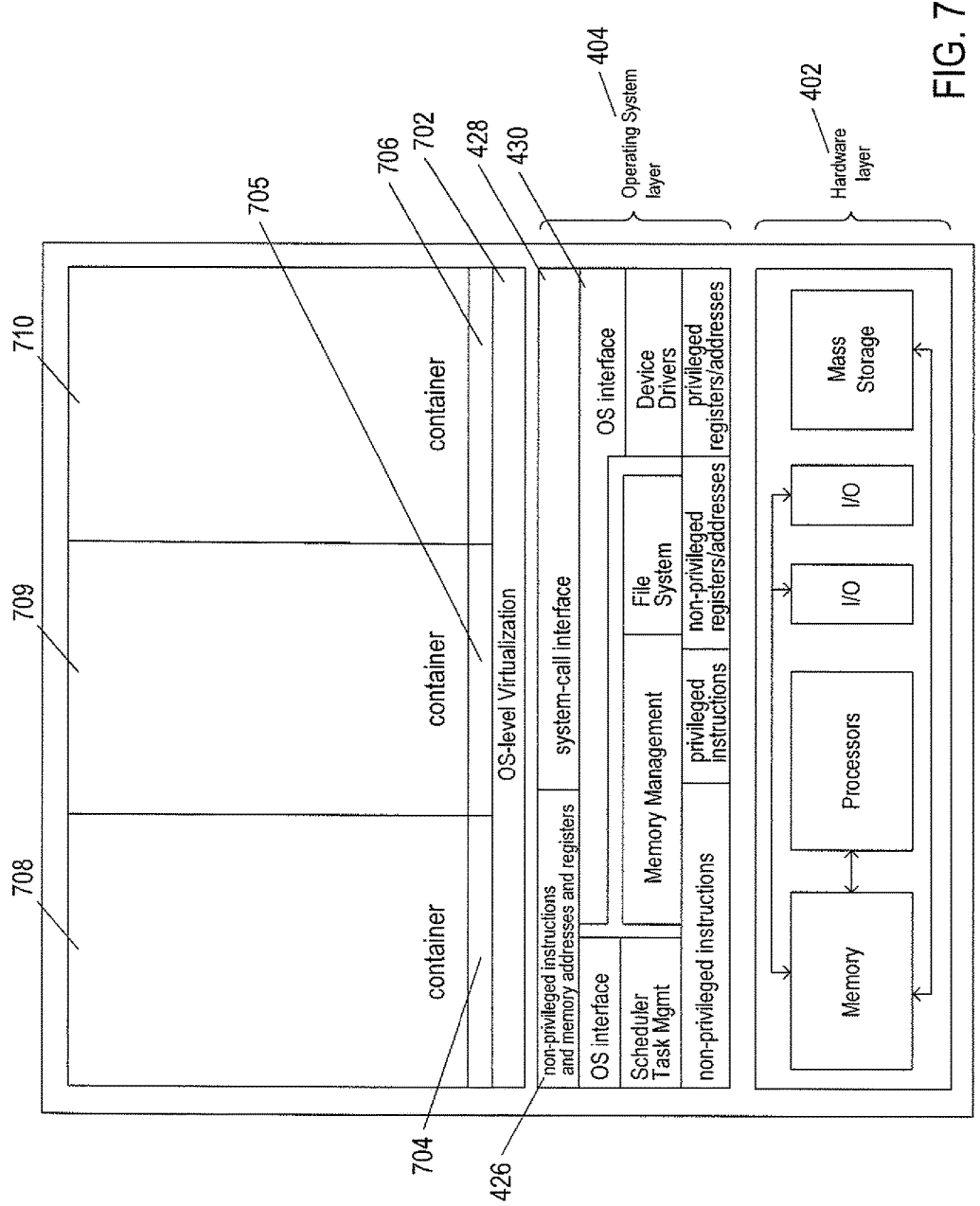
FIG. 7 shows virtual data centers provided as an abstraction of underlying physical-data-center hardware components.

FIG. 7 shows an example computer system used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 702 that provides operating-system interfaces 704-706 to each of the containers 708-710. The containers, in turn, provide an execution environment for an application that runs within the execution environment provided by container 708. A container may be thought of as a partition of the resources generally available to higher-level computational entities through the operating system interface 430.

Figure 8:
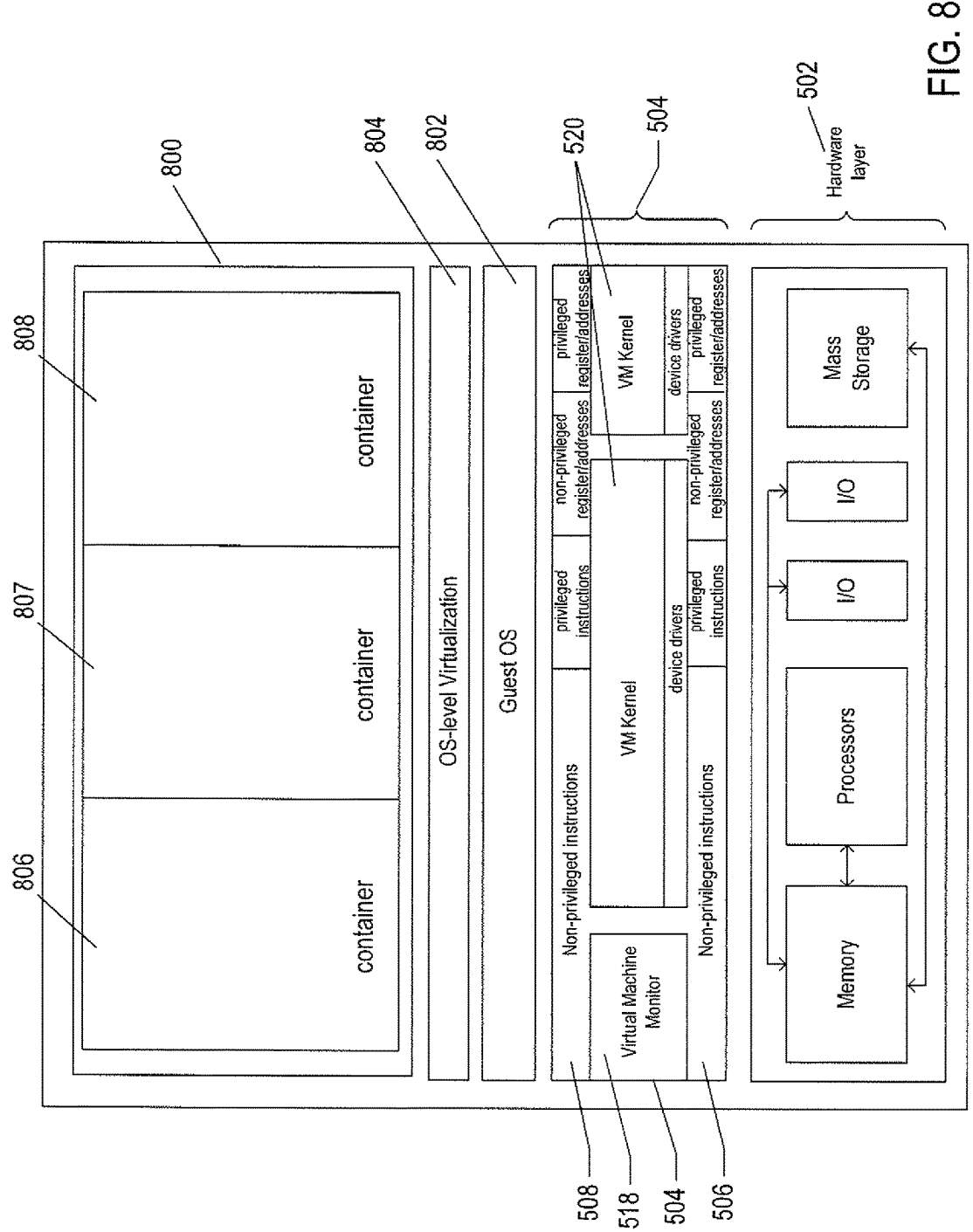
FIG. 8 shows virtual-machine components of a virtual-data-center management server and physical servers of a physical data center.

FIG. 8 shows an approach to implementing the containers on a VM 800. FIG. 8 shows a host computer similar to that shown in Figure 5A, discussed above. The host computer includes a hardware layer 502 and a virtualization layer 504 that provides a virtual hardware interface 508 to a guest operating system 802. Unlike in FIG. 5A, the guest operating system 802 interfaces to an OSL-virtualization layer 804 that provides container execution environments 806-808 to multiple application programs.

Note that, although only a single guest operating system and OSL virtualization layer are shown in FIG. 8, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 804 in FIG. 8, because there is almost no additional computational overhead associated with container-based partitioning of resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large distributed computing systems and a simple approach to operating-system upgrades and patches. Thus, the use of OSL virtualization above traditional virtualization in a hybrid virtualized distributed computing system, as shown in FIG. 13, provides many of the advantages of both a traditional virtualization layer and the advantages of OSL virtualization.

Methods and Systems to Quantify and Prioritize Alerts in a Computing System

An information technology ("IT") operations management tool, such as VMware's vRealize® Operations™, may be used to monitor usage, performance, and capacity of resources of each computer system, data-storage device, and other components of a distributed computing system. The resources include, but are not limited to, processors, memory, network connections, and storage of each computer system, data-storage device, and other components of the distributed computing system. The resources also include virtual resources of the distributed computing system. The IT operations management tool generates time series metric data for each resource. For example, time series metric data includes CPU usage, memory usage, network throughput, network traffic, and storage usage. CPU usage is a measure of CPU time used to process instructions of an application program or operating system as a percentage of CPU capacity. High CPU usage may be an indication of usually large demand for processing power, such as when an application program enters an infinite loop. Memory usage is the amount of memory (e.g., GBs) a computer system uses at a given time. Network throughput is the number of bits of data transmitted to and from a component or data-storage device and is often recorded in megabits, kilobits or simply bits per second. Network traffic is a count of the number of data packets received at and send to a component at a given time. A high number of data packets sent to one or more computer systems in a distributed computing system may be an indication of a denial of service ("DOS") attack, high volume of user traffic, or any of many different problems associated with running an application program. Storage usage is the amount of storage in use at a given time.

Figure 9:
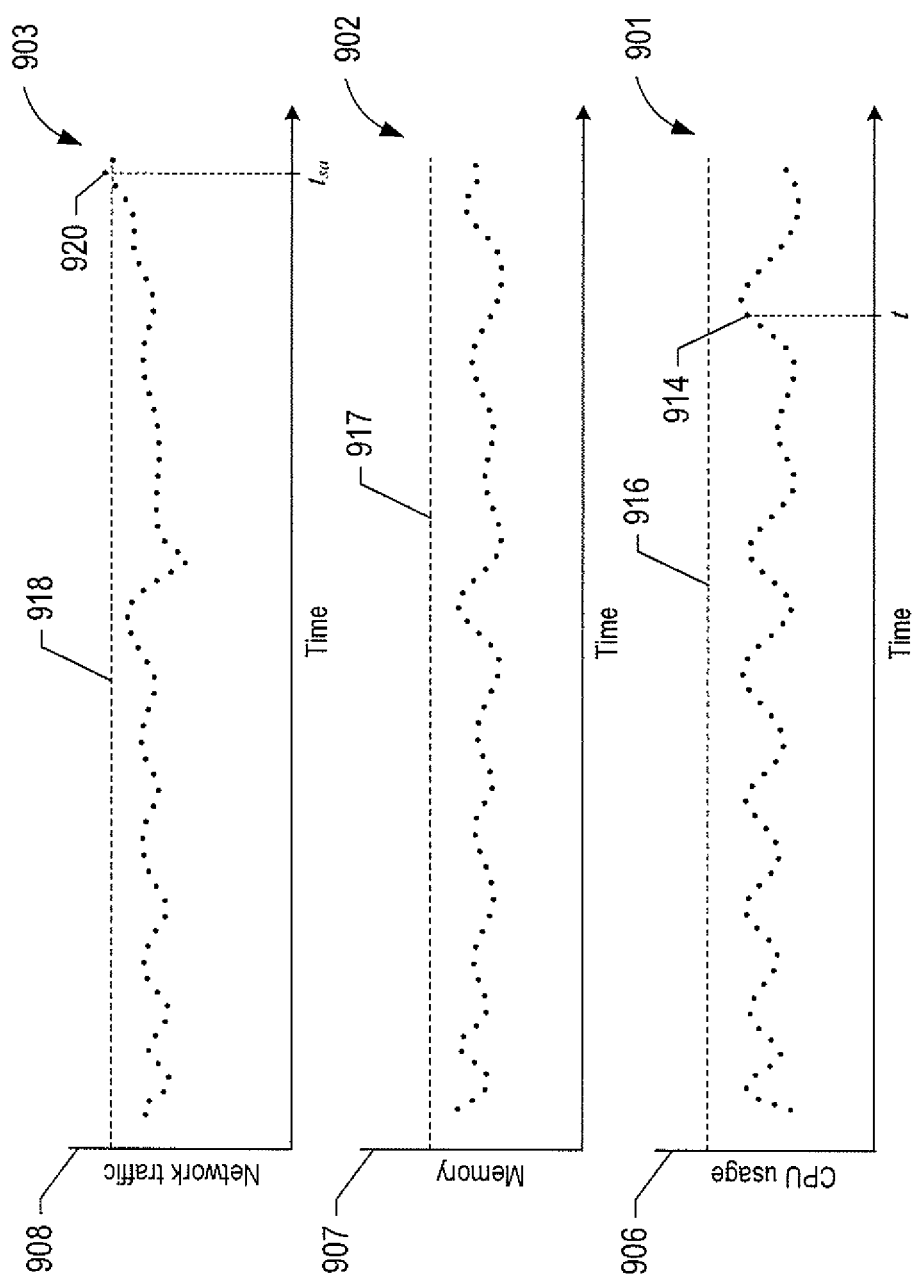
FIG. 9 shows example plots of three different types of time series metric data for a computer system in a distributed computing system.

FIG. 9 shows example plots of three different types of time series metric data for a component in a distributed computing system. The plots of metric data are CPU usage 901, memory usage 902, and network traffic 903 for a CPU, memory, and network traffic, respectively of the component. Horizontal axes, such as horizontal axis 904, represent time axes. Vertical axes 906-908 represent ranges of CPU usage, memory usage, and network traffic, respectively. Dotted curves 910, 911, and 912 represent CPU usage, memory usage, and network traffic metric data generated by the IT operations management tool at each time stamp. For example, dot 914 represent CPU usage at time t. Dashed lines 916-918 represent thresholds for generating an alert when one of the metrics is greater than a corresponding threshold. In other words, when a value of a resource metric is greater than a corresponding threshold, the threshold is considered violated and the IT operations management tool generates an alert in response. For example, plots 902 and 903 show metric data that lies below the corresponding thresholds 916 and 917, respectively. As a result, no alert is generated for the metric data shown in these two plots. On the other hand, the plot of network traffic 903 shows a threshold violation that occurs because a network traffic metric value 920 is greater than the threshold 918 at a time $t_{sa}$.

Figure 10:
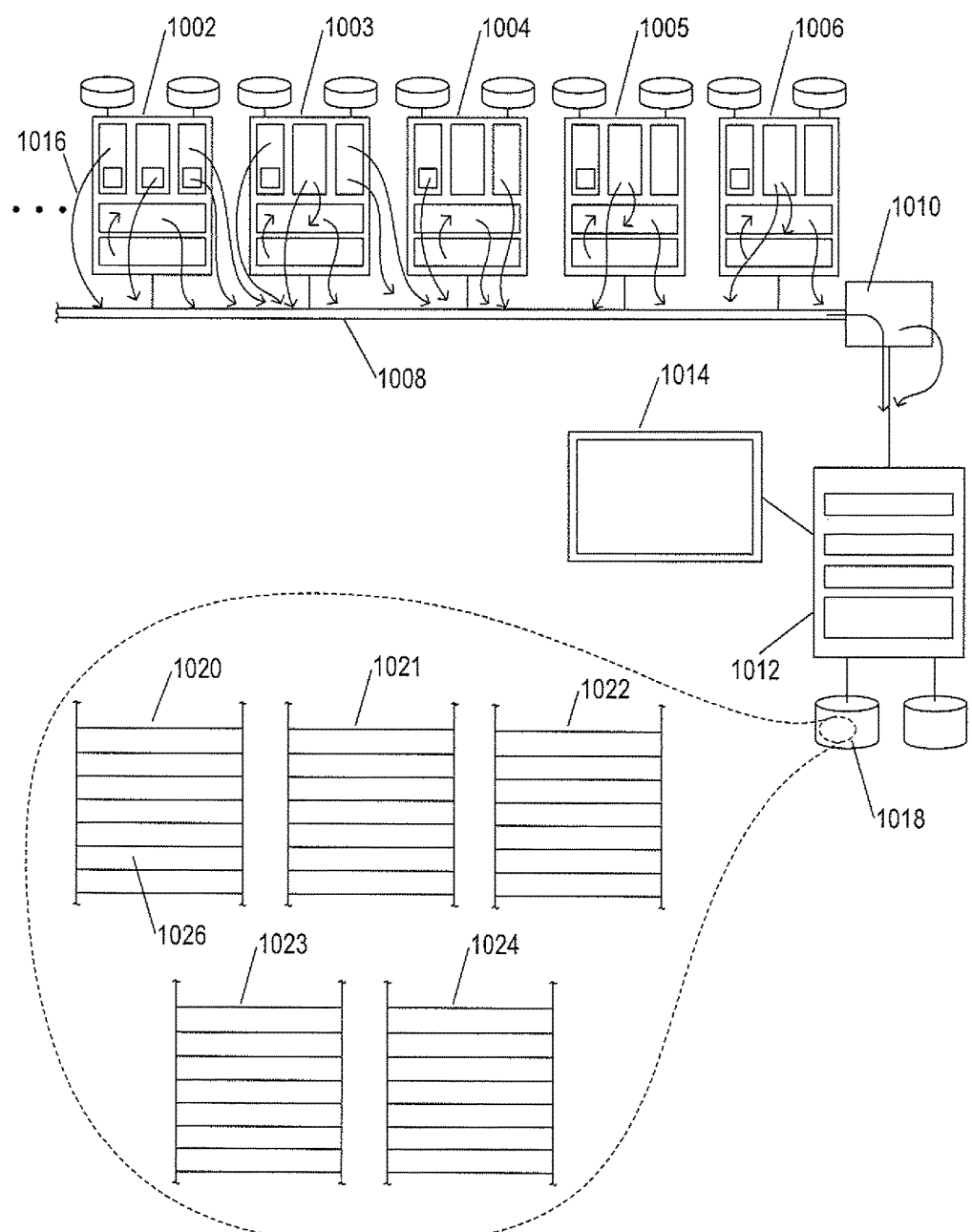
FIG. 10 shows an example of logging event messages in event logs.

Another tool used to monitor a distributed components of a distributed computing system include log management tools, such as VMware's vRealize Log Insight. Log management tools maintain event store of the massive amounts of event messages generated by various computer systems, applications, operating systems and other sources of event messages generated in a distributed computing system. FIG. 10 shows an example of logging event messages in event logs. In FIG. 10, a number of computer systems 1002-1006 within a distributed computing system are linked together by an electronic communications medium 1008 and additionally linked through a communications bridge/router 1010 to an administration computer system 1012, or a log management server computer, that includes an administrative console 1014. As indicated by curved arrows, such as curved arrow 1016, multiple components within each of the discrete computer systems 1002-1006 as well as the communications bridge/router 1010 generate event messages that are transmitted to the administration computer 1012. Event messages may be generated by any event source. Event sources may be, but are not limited to, application programs, operating systems, VMs, guest operating systems, containers, network devices, machine codes, event channels, and other computer programs or processes running on the computer systems 1002-1006, the bridge/router 1010, data-storage devices, and any other components of the distributed computing system. Event messages may be relatively directly transmitted from a component within a discrete computer system to the administration computer 1012 or may be collected at various hierarchical levels within a discrete computer system and then forwarded from an event-message-collecting entity within the discrete computer system to the administration computer 1012. A log management tool running on the administration computer 1012 collects and stores the event messages in an event store located on a data-storage device or appliance 1018. The event store includes event logs 1020-1024. Rectangles, such as rectangle 1026, represent individual event messages. For example, event log 1020 may comprise a list of event messages generated by various event sources running within the computer system 1002.

Figure 11:
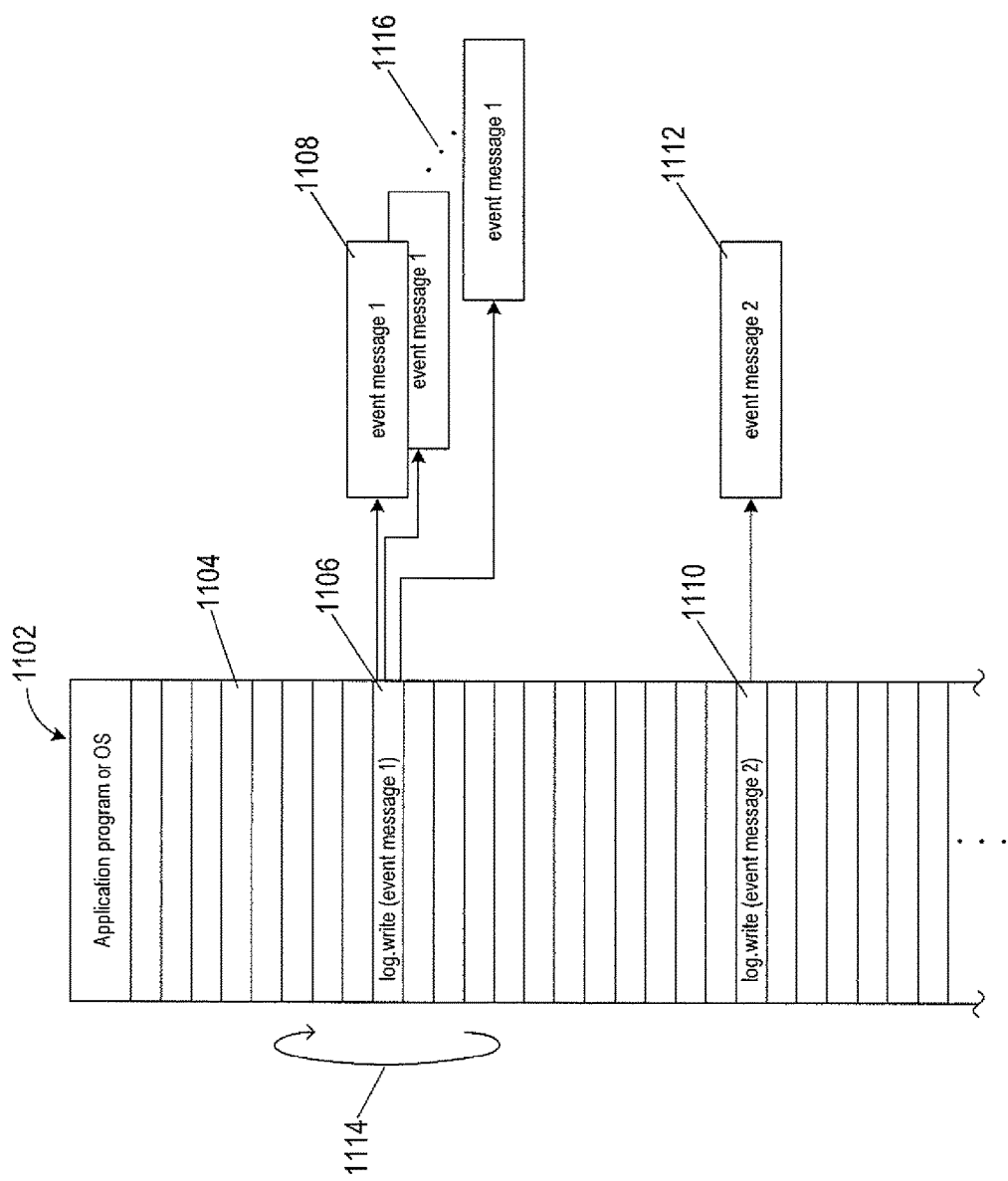
FIG. 11 shows an example of a source code with log write instructions.

FIG. 11 shows an example of a source code 1102 of an application program, an operating system, a VM, a guest operating system, a container, or any other computer program or machine code. The source code 1102 is just one example of an event source that generates event messages. Rectangles, such as rectangle 1104, represent a definition, a comment, a statement, or a computer instruction that expresses some action to be executed by a discrete computer system. The source code 1102 includes log write instructions that generate event messages when certain events predetermined by the developer occur during execution of the source code 1102. For example, source code 1102 includes an example log write instruction 1106 that when executed generates an "event message 1" represented by rectangle 1108, and a second example log write instruction 1110 that when executed generates "event message 2" represented by rectangle 1112. In the example of FIG. 11, the log write instruction 1106 is embedded within a set of computer instructions that are repeatedly executed in a loop 1114. As shown in FIG. 11, the same event message 1 is repeatedly generated 1116. The same type of log write instructions may also be located in different places throughout the source code, which in turns creates repeats of essentially the same type of event message in an event log.

In FIG. 11, the notation "log.write( )" is a general representation of a log write instruction. In practice, the form of the log write instruction varies for different programming languages. In general, event messages are relatively cryptic, including generally only one or two natural-language words and/or phrases as well as various types of text strings that represent file names, path names, and, perhaps various alphanumeric parameters. In practice, a log write instruction may also include the name of the source of the event message (e.g., name of the application program or operating system and version) and the name of the event log to which the event message is written. Log write instructions may be written in a source code by the developer of an application program or operating system in order to record events that occur while an operating system or application program is running. For example, a developer may include log write instructions that are executed when certain events occur, such as failures, logins, or errors.

FIG. 12 shows an example of a log write instruction 1202. In the example of FIG. 12, the log write instruction 1202 includes arguments identified with "$." For example, the log write instruction 1202 includes a time-stamp argument 1204, a thread number argument 1205, and an internet protocol ("IP") address argument 1206. The example log write instruction 1202 also includes text strings and natural-language words and phrases that identify the type of event that triggered the log write instruction, such as a "Repair session" 1208. The text strings between brackets "[ ]" represent file-system paths, such as path 1210. When the log write instruction 1202 is executed, parameters are assigned to the arguments and the text strings and natural-language words and phrases are stored as an event message in an event log.

FIG. 13 shows an example of an event message 1302 generated by the log write instruction 1202. The arguments of the log write instruction 1202 may be assigned numerical parameters that are recorded in the event message 1302 at the time the event message is written to the event log. For example, the time stamp 1204, thread 1205, and IP address 1206 of the log write instruction 1202 are assigned corresponding numerical parameters 1304-1306 in the event message 1302. The time stamp 1304, in particular, represents the date and time the event message is generated. The text strings and natural-language words and phrases of the log write instruction 1202 also appear unchanged in the event message 1302 and may be used to identify the type of event that occurred during execution of the application program or operating system.

As event messages are received from various event sources, the event messages are stored in the order in which the event messages are received. FIG. 14 shows a small, eight-entry portion of an event log 1402. In FIG. 14, each rectangular cell, such as rectangular cell 1404, of the portion of the event log 1402 represents a single stored event message. For example, event message 1402 includes a short natural-language phrase 1406, date 1408 and time 1410 numerical parameters, as well as, a numerical parameter 1412 that appears to identify a particular host computer.

Figure 15A:
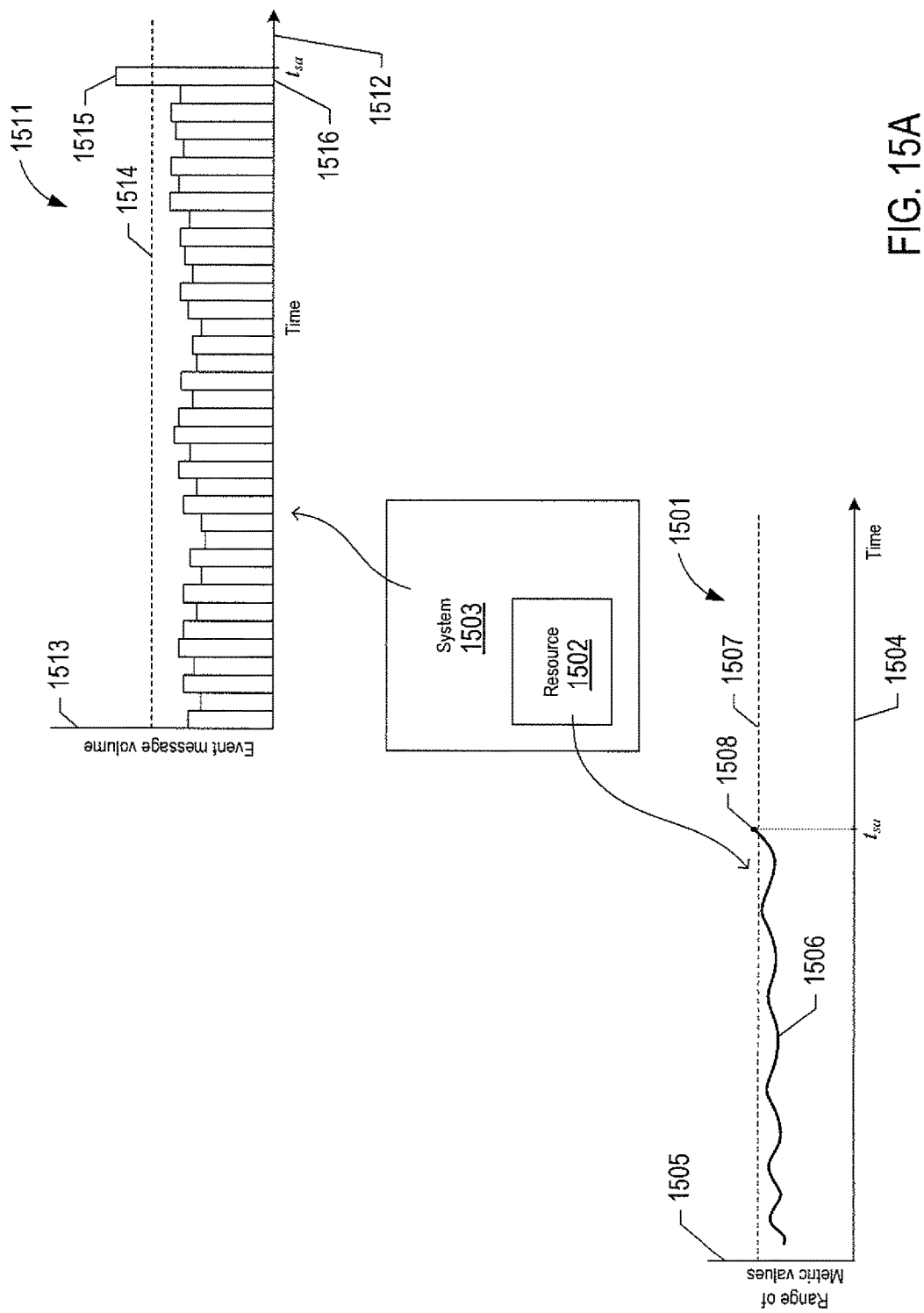
FIG. 15A-15B shows a plot of example time series metric data used to monitor a resource of a system.

IT operations management tool and a log management tool generate alerts when components of a distributed computing system exhibit anomalous behavior or a problem. FIG. 15A shows a plot 1501 of example time series metric data used to monitor a resource 1502 of a system 1503. The system 1503 may be a computer system, such as a server computer, a data-storage device, or any other component of a distributed computing system. The system 1503 may also be a distributed computing system. The resource 1502 may be a physical or virtual resource of the system 1503, such as a physical or virtual CPU, memory, network connection, or storage. Horizontal axis 1504 represents time. Vertical axis 1505 represents a range of values for the metric. Curve 1506 represents time series metric data generated by an IT operations management tool that monitors the resource 1502 over time. Dashed line 1507 represents a threshold for the metric data 1506. As shown in FIG. 15A, metric data value 1508 violates the threshold 1507 at a time $t_{sa}$. In this example, the IT management tool generates an alert, indicating that the metric data associated with the resource 1502 has violated the threshold. Event messages generated by the system 1503 may also be used to monitor the system 1503 for anomalous behavior or problems. FIG. 15A shows a plot 1511 of event message volume generated by event sources of the system 1503 in time intervals. Horizontal axis 1512 represents time. Vertical axis 1513 represents event message volume. Bars represent the number of event messages generated by event sources of the system 1503 in adjacent time intervals. In this example, an alert is generated by the log management tool when the number of event messages 1515 generated in a time interval 1516 is greater than a log-volume threshold represented by dashed line 1514. The time of the alert, $t_{sa}$, is located at the end of the time interval 1516.

An alert may be triggered in real time and coincide with the actual time of anomalous behavior or a system problem. In certain situations, the time $t_{sa}$ of an alert may not actually coincide with the point in time when a problem occurred in the system 1503. A system problem may have occurred earlier in time but does not appear as an alert until later. A way to identify a system problem that occurred before the problem appears as an alert is to identify alert triggers in event messages generated by the system 1503 prior to the time $t_{sa}$ of the alert. An alert trigger may be a word, phrase, numerical value in an event message, type of the event message, quantity of certain event messages, or quantity of certain event types that leads to system problems and may trigger alerts. Event types are determined by deleting variable parts of event messages leaving static numerical and text parts as described below with reference to FIG. 18. Examples of words, phrases, and numerical values that are alert triggers include, but are not limited to, "fatal error," "warning," "debug," "403" (HTTP status code indicating forbidden access), "550" (SMTP reply code indicating recipient mailbox unavailable), and "wrong login." An alert trigger may also be a non-variable numerical or text value that occurs more frequently or less frequently than a defined threshold. Methods search event messages generated in a time interval before the time $t_{sa}$ of an alert for an alert trigger.

Figure 15B:
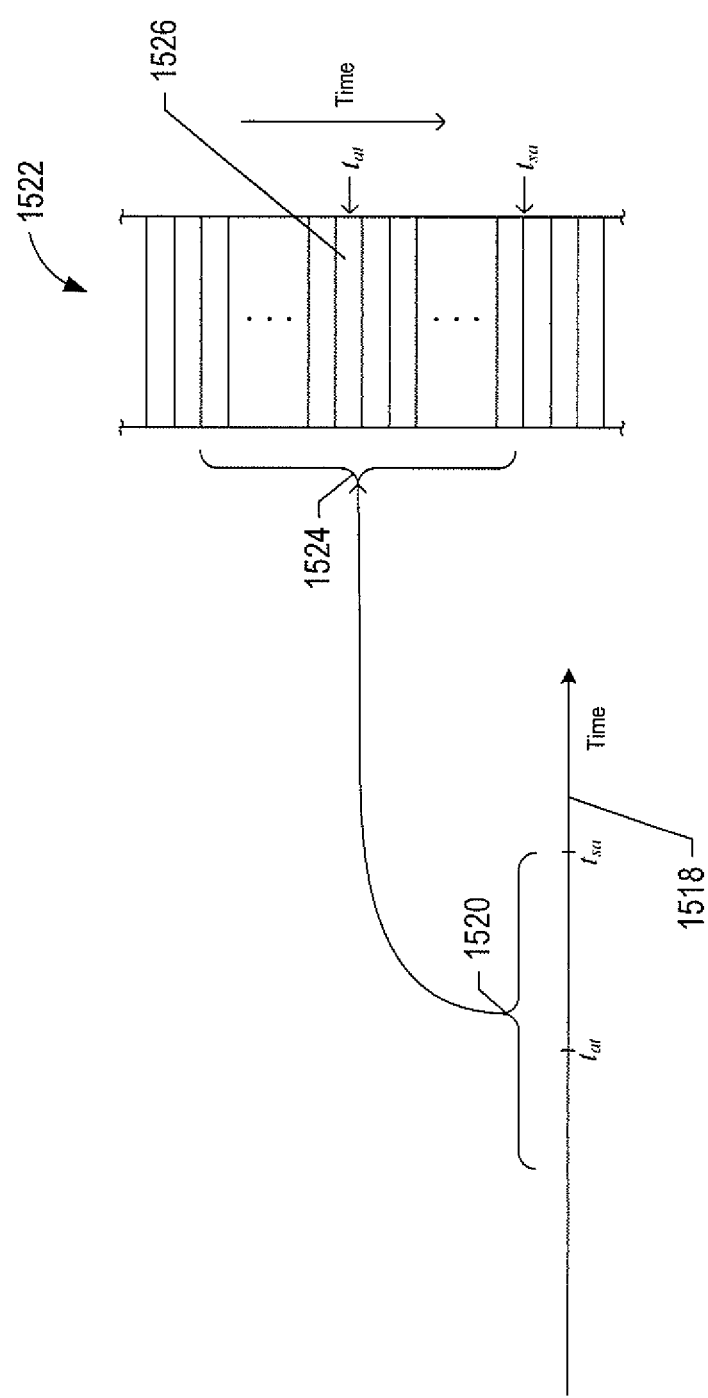

FIG. 15B shows an example of identifying an alert trigger in event messages generated in a time interval before an alert. In the example of FIG. 15B, an alert is generated at time $t_{sa}$ located along a time axis 1518. Event messages generated by the system 1503 in a time interval 1520 that ends with the time $t_{sa}$ may be searched to identify an alert trigger. FIG. 15B shows a series of event messages 1522 generated by the system 1503. The event messages 1524 with time stamps in the time interval 1520 may be searched for alert triggers. In the example of FIG. 15B, an event message 1526 with time stamp $t_{at}$ is identified as having an alert trigger. A search may be performed on the non-parametric tokens of the event messages or frequency of certain event messages or event types, as described below with reference to FIG. 18.

In certain implementations, event messages may be periodically searched to identify alert triggers and the time stamp $t_{at}$ of the event message. For example, methods may periodically search the incoming event messages for an alert trigger every 30 second, every minute, every 2 minutes, every 5 minutes, and any suitable period of time.

In the following discussion, an alert time, or time of an alert, is denoted by $t_a$. An alert may be an indication of anomalous behavior or a system problem that occurred in real time at time $t_{sa}$. In this case, the alert time $t_a$ represents the actual time $t_{sa}$ of the alert and coincides with the real time start of the system problem as described above. Alternatively, a system problem may have started before an alert is generated as described above with reference to FIG. 15B. Event messages may be used to identify an alert trigger and a time $t_{at}$ of the alert trigger. In this case, the alert time $t_a$ is adjusted to the time $t_{at}$ of the alert trigger but is still referred to as the alert time below. However, it is not possible from an alert alone to determine the severity of the problem within a system. The problem may be temporary and resolve after the alert, the problem may be periodic and resolve after the alert, or the alert may be maintained over a long period of time. In order to evaluate an alert, methods and systems read two sets of event messages in the event store created by event sources of the system. One set comprises event messages recorded before the alert and the other set comprises event messages recorded after the alert. The two sets of event messages are compared as describe below to determine whether or not the alert is an indicator of a global problem with the system or a local problem with the system and determine a level of priority for responding to the alert.

After an alert, methods allow a time period to elapse in which event messages generated by event sources of the system 1503 are recorded in one or more event stores as described above with FIG. 10. The duration of the time period in which event messages are allowed to be recorded in the one or more event logs may be less than a minute, such as 10, 20, 30, 40, or 50 seconds after the alert. The duration of the time period may be longer than a minute but less than an hour, such as 1 minute, 5 minutes, 10 minutes, or 50 minutes after the alert. The duration of the time period may be longer than an hour but less than 24 hours, such as 2 hours, 3 hours, or 6 hours. The duration of the time period may be on the order of days.

Figure 16A:
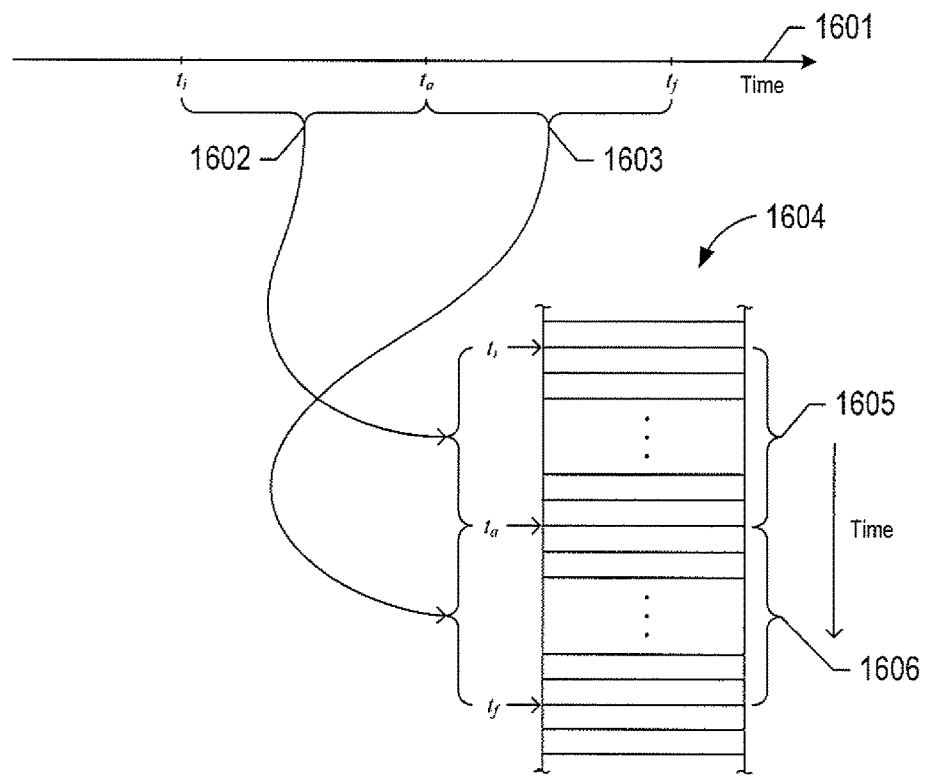
FIG. 16A shows a plot of the time series metric data generated after an alert and associated event messages of an event store.

In certain implementations, methods read event messages generated in a pre-alert time interval and read event messages generated in a post-alert time interval. FIG. 16A shows a time axis 1601 with the alert time $t_a$ that may represent either the actual start time of the system problem or start time of the alert trigger. The alert may have been generated by an IT operations management tool or by a log management tool as described above with reference to FIG. 15. A pre-alert time interval 1602 is defined by $t_i \le t < t_a$, where $t_i$ is a time less than the time $t_a$. A post-alert time interval 1603 is defined by $t_a < t \le t_f$, where $t_f$ is a time greater than the time $t_a$. The duration of the pre-alert time interval and the duration of post-alert time internal may be equal (i.e., $t_a - t_i = t_f - t_a$). FIG. 16A also shows a portion of an event log 1604 with event messages generated by one or more event sources of the system 1503 recorded before and after the time $t_a$ of the alert. Rectangles 1605 represent pre-alert event messages recorded in the event log 1604 with time stamps in the pre-alert time interval 1602. Rectangles 1606 represent post-alert event messages recorded in the event log 1604 with time stamps in the post-alert time interval 1603.

Figure 16B:
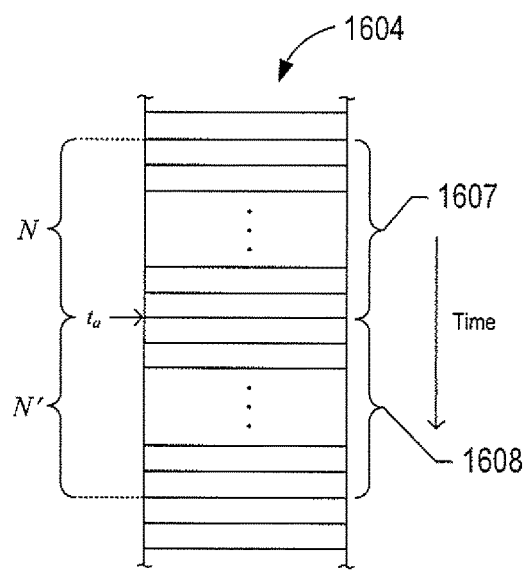
FIG. 16B shows an example of pre-alert and post-alert event messages.

In other implementations, rather than considering pre-alert and post-alert event messages generated within corresponding pre-alert and post-alert time intervals, fixed numbers of pre-alert and post-alert event messages that are generated closest to the time $t_a$ of the alert may be considered. FIG. 16B shows obtaining fixed numbers of pre-alert and post-alert event messages. Pre-alert event messages 1607 comprise a fixed number N of event messages recorded in the event log 1604 with time stamps that precede and are closest to the alert time $t_a$. Post-alert event messages 1608 comprise of a fixed number N' of event messages recorded in the event log 1604 with time stamps that follow and are closest to the alert time $t_a$. In certain embodiments, the fixed numbers N and N' may be equal so that the number of pre-alert event messages and number of post-alert event messages are the same. In other embodiments, the fixed number N' of post-alert event messages may be greater than the fixed number N of pre-alert event messages.

Figure 17:
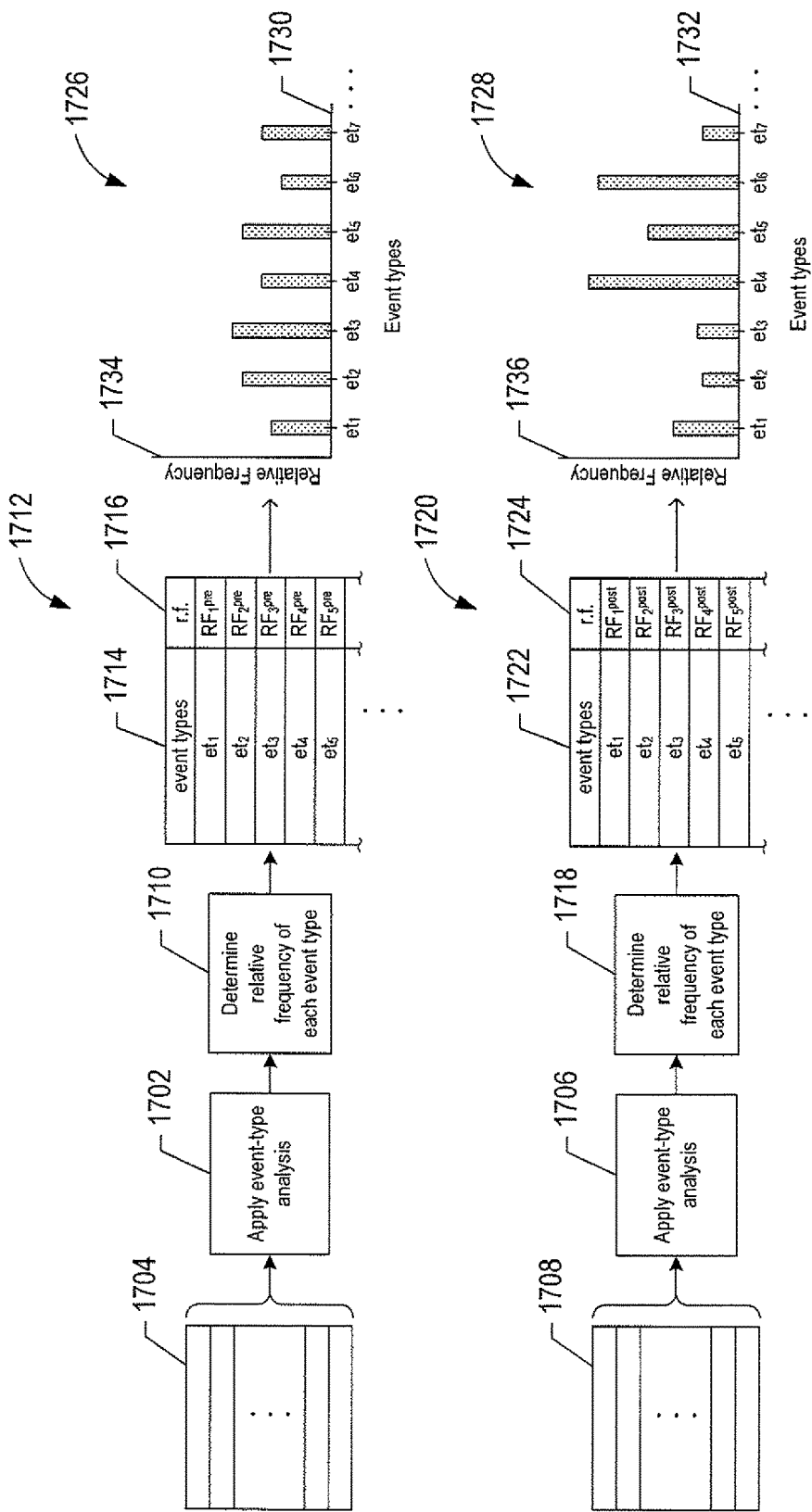
FIG. 17 shows pre-alert and post-alert event-type logs obtained from corresponding pre-alert and post-alert event messages.

FIG. 17 shows pre-alert and post-alert event-type logs obtained from corresponding pre-alert and post-alert event messages recorded in the event log 1604. In block 1702, event-type analysis is applied to each event message of the pre-alert event messages 1704 in order to determine the event type of each event message in the pre-alert event messages 1704. In block 1706, event-type analysis is also applied to each event message of post-alert event messages 1708 in order to determine the event type of each event message in the pre-alert event messages 1708. The pre-alert and post-alert event messages 1704 and 1708 may be obtained as described above with reference to FIGS. 16A-16B. Event-type analysis applied in blocks 1702 and 1706 to each event message of the pre-alert and post-alert event messages 1704 and 1708 reduces the event message to text strings and natural-language words and phrases (i.e., non-parametric tokens).

Figure 18:
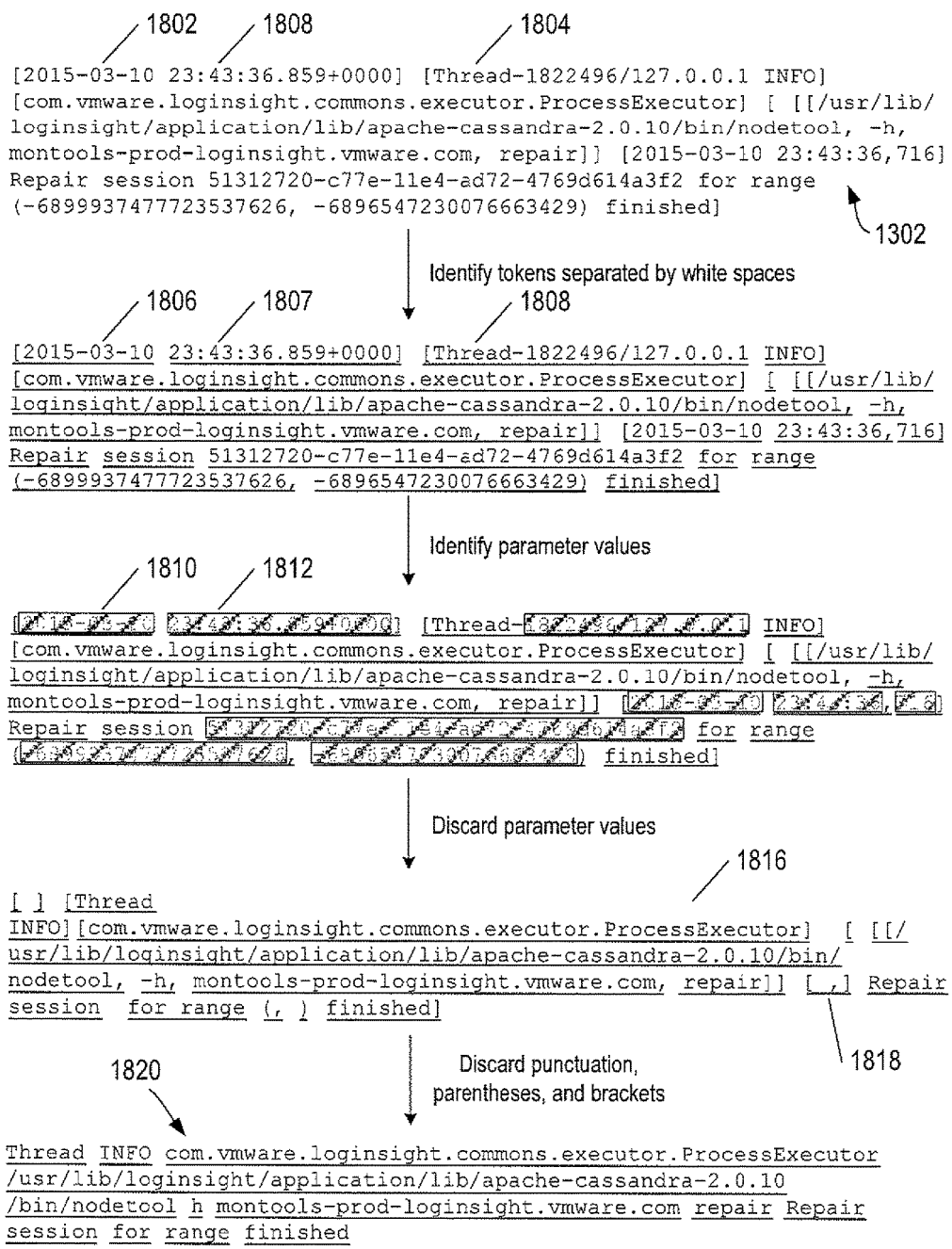
FIG. 18 shows an example of event-type analysis performed on an event message.

FIG. 18 shows an example of event-type analysis performed on the event message 1302 shown in FIG. 13. The event message 1302 is first tokenized by considering the event message as comprising tokens separated by non-printed characters, referred to as "white space." In FIG. 18, this initial tokenization of the event message 1302 is illustrated by underlining of the printed or visible characters. For example, the date 1802, time 1803, and thread 1804 at the beginning of the text contents of the event message 1802, following initial tokenization, become a first token 1806, a second token 1807, and a third token 1808, as indicated by underlining. Next, a token-recognition pass is made to recognize any of the initial tokens as various types of parameters. Parameters are tokens or message fields that are likely to be highly variable over a set of messages of a particular type. Date/time stamps, for example, are nearly unique for each event message, with two event messages having an identical date/time stamp only in the case that the two event messages are generated within less than a second of one another. Additional examples of parameters include global unique identifiers ("GUIDs"), hypertext transfer protocol status values ("HTTP statuses"), universal resource locators ("URLs"), network addresses, and other types of common information entities that identify variable aspects of an event type. By contrast, the phrase "Repair session" in event message 1302 likely occurs within each of a large number of repair session event messages. In FIG. 18, the parametric-valued tokens in the event message following initial token recognition are indicated by shading. For example, initial token recognition determines that the first token 1806 is a date and the second token 1807 is a time. The tokens identified as parameters are identified by shaded rectangles, such as shaded rectangle 1810 of the date 1806 and shaded rectangle of 1812 of the time 1807. The parametric-valued tokens are discarded leaving the non-parametric text strings, natural language words and phrases, punctuation, parentheses, and brackets. Various types of symbolically encoded values, including dates, times, machine addresses, network addresses, and other such parameters can be recognized using regular expressions or programmatically. For example, there are numerous ways to represent dates. A program or a set of regular expressions can be used to recognize symbolically encoded dates in any of the common formats. It is possible that the token-recognition process may incorrectly determine that an arbitrary alphanumeric string represents some type of symbolically encoded parameter when, in fact, the alphanumeric string only coincidentally has a form that can be interpreted to be a parameter. The currently described methods and systems do not depend on absolute precision and reliability of the event-message-preparation process. Occasional misinterpretations generally do not result in mistyping of event messages and, in the rare circumstances in which event messages may be mistyped, the mistyping is most often discovered during subsequent processing. In the implementation shown in FIG. 18, the event message 1302 is subject to textualization in which an additional token-recognition step of the non-parametric portions of the event message is performed in order to remove punctuation and separation symbols, such as parentheses and brackets, commas, and dashes that occur as separate tokens or that occur at the leading and trailing extremities of previously recognized non-parametric tokens, as shown by underlining in the retokenized event message 1814 in FIG. 18. For example, brackets and a coma 1818 are underlined. The punctuation, parentheses, and brackets are discarded leaving a textualized event message of interest 1820 that comprises only the non-parametric text strings and natural language words and phrases of the original event message 1302. The textualized event message 1820 represents an event type. Other textualized event messages with the same non-parametric text strings and natural language words and phrase as the textualized event messages 1820 are the same event type. Another textualized event message with one or more different non-parametric text strings or natural language words and phrase from those of the textualized event messages 1820 is of a different event type. In the following discussion, the notation $et_k$ represents an event type of or one or more event messages, where k is a positive integer event type index.

Returning to FIG. 17, in block 1710, relative frequencies of the event types of the pre-alert event messages identified in block 1702 are computed. For each event type of the pre-alert event messages 1704, the relative frequency is given by $$RF_k^{pre} = \frac{n_{pre}(et_k)}{N_{pre}} \tag{1a}$$

where $n_{pre}(et_k)$ is the number of times the event type $et_k$ appears in the pre-alert event messages; and $N_{pre}$ is the total number pre-alert event messages.

The total number of pre-alert event messages $N_{pre}$ may be the number of event messages recorded in the pre-alert time interval described above with reference to FIG. 16A. Alternatively, the total number of pre-alert event messages $N_{pre}$ may be the pre-selected fixed number of event messages recorded before the alert time $t_a$ described above with reference to FIG. 16B. A pre-alert event type log 1712 is formed from the different event types and associated relative frequencies. The pre-alert event-type log 1712 comprises a list of the different event types 1714 in the pre-alert event messages 1704 and corresponding relative frequencies 1716 of each event type in the pre-alert event messages 1704. In block 1718, relative frequencies of the event types of the post-alert event messages identified in block 1706 are also computed. For each event type of the post-alert event messages 1708, the relative frequency is given by $$RF_k^{post} = \frac{n_{post}(et_k)}{N_{post}} \tag{1b}$$

where $n_{post}(et_k)$ is the number of times the event type $et_k$ appears in the post-alert event messages; and $N_{post}$ is the total number post-alert event messages.

The total number of post-alert event messages $N_{post}$ may be the number of event messages recorded in the post-alert time interval described above with reference to FIG. 16A. Alternatively, the total number of post-alert event messages $N_{post}$ may be the pre-selected fixed number of event messages recorded after the alert time $t_a$ described above with reference to FIG. 16B. A post-alert event type log 1720 is formed from the different event types and associated relative frequencies. The post-alert event-type log 1720 comprises a list of the different event types 1722 in the post-alert event messages 1708 and corresponding relative frequencies 1724 of each event type in the post-alert event messages 1704.

FIG. 17 shows a histogram 1726 of the pre-alert event type distribution and a histogram 1728 of post-alert event type distribution. Horizontal axes 1730 and 1732 represent the event types. Vertical axes 1734 and 1736 represent relative frequency ranges. Shaded bars represent the relative frequency of each event type. In the example, of FIG. 17, the pre-alert event type distribution 1726 and the post alert event type distribution 1728 display differences in the relative frequencies of certain event types both before and after the alert while the relative frequencies of other event types appear unchanged before and after the alert. For example, the relative frequency of the event type $et_1$ did not change before and after the alert. By contrast, the relative frequencies of the event types $et_4$ and $et_6$ increased significantly after the alert, which may an indication of a global problem.

Methods compute a run time global impact factor, denoted by $GIF(t_a)$, for the alert at time $t_a$ as a function of the pre-alert event-type distribution of event type frequencies and the post-alert event-type distribution of event type frequencies. The global impact factor provides a quantitative measure of a change to the system of a distributed computing system that is indicated by the alert. The value of the global impact factor indicates how many event types are different between pre-alert and post-alert event type distributions. The value of the global impact factor also indicates how much the relative frequencies of the event types in the pre-alert event type distribution differ from the same event types in the post-alert event type distribution.

In one implementation, a run-time global impact factor may be computed using the Jensen-Shannon divergence between the pre-alert event type distribution and the post-alert event type distribution:

$$GIF_{JS}(t_a) = -\sum_{k=1}^{K} M_k \log M_k + \frac{1}{2}\left[\sum_{k=1}^{K} P_k \log P_k + \sum_{k=1}^{K} Q_k \log Q_k\right] \quad (2)$$

where $P_k = RF_k^{pre}$ $Q_k = RF_k^{post}$; and $M_k = (P_k + Q_k)/2$.

In another implementation, the run-time global impact factor between pre-alert and post-alert event types distributions may be computed using an inverse cosine as follows:

$$GIF_{CS}(t_a) = 1 - \frac{2}{\pi}\cos^{-1}\left[\frac{\sum_{k=1}^{K} P_k Q_k}{\sqrt{\sum_{k=1}^{K}(P_k)^2}\sqrt{\sum_{k=1}^{K}(Q_k)^2}}\right] \quad (3)$$

The global impact factor $GIF_{JS}(t_a)$ given by Equation (2) and the global impact factor $GIF_{CS}(t_a)$ given by Equation (3) both satisfy the condition $$0 \leq GIF(t_a) \leq 1 \quad (4)$$

The global impact factor $GIF(t_a)$ is a normalized value that may be used to measure how much, or to what degree, the post-alert event type distribution differs from the pre-alert event type distribution. The closer the global impact factor $GIF(t_a)$ is to zero, the closer the pre-alert event type distribution and the post-alert event type distribution are to one another. For example, when $D_{JS}=0$, the pre-alert event type distribution and the post-alert event type distribution are identical. On the other hand, the closer the global impact factor $GIF(t_a)$ is to one, the farther the pre-alert event type distribution and the post-alert event type distribution are from one another. For example, when $GIF(t_a)=1$, the pre-alert event type distribution and the post-alert event type distribution are as far apart from one another as possible.

The global impact factor $GIF(t_a)$ may be used to determine whether the impact of a change to a system indicated by an alert has a global impact or a local impact on the system. If the alert is identified as having a global impact the global impact factor $GIF(t_a)$ may be used to prioritize remedial action to correct the change to the system. The closer the global impact factor $GIF(t_a)$ is to one, a larger number of event sources of a system have changed operation after an alert, which is an indication of a global impact on the system. The closer the global impact factor $GIF(t_a)$ is to zero, a small number of or relatively few, event sources of a system have changed operation after an alert, which is an indication of a local impact on the system. For example, perhaps only one, two, or three event sources of the system have changed operation after the alert.

A global impact threshold, $T_G$, may be used to assign a run-time global impact or local impact to an alert. When the global impact factor $GIF(t_a)$ satisfies the condition $$0 < T_G \leq GIF(t_a) \leq 1 \quad (5)$$

the alert may identified with a change to the system that has a global impact.

Alerts having a global impact on the system may be ranked in descending order according to associated global impact factors. Higher ranked alerts may be assigned a higher priority during troubleshooting and recommendations for addressing the alert. For example, GIF(alert 1), GIF(alert 2), and GIF(alert 3) represent three different global impact factors computed for three different alerts generated for a system as described above. Suppose the descending order of global impact factors is GIF(alert 2)>GIF(alert 1)>GIF(alert 3)

Alert 2 is assigned highest priority, alert 1 is assigned the next highest priority, and alert 3 is assigned the lowest priority. A recommendation may be generated for each priority level. A system administrator may use the priority level and recommendation to perform an appropriate response.

Alerts may also be rank ordered according to historical impact on a system. Consider a set of historical global impact factors computed for the same alert generated M times in the past by a system:

$$\{GIF(t_1), GIF(t_2), \ldots, GIF(t_M)\} \quad (6)$$

where $t_1, t_2, \ldots, t_M$ represent past alert times; and

M represents a number of past alert times.

The average run-time global impact factor for the alert is computed as follows:

$$GIF_{AVE}(\text{alert}) = \sum_{m=1}^{M} w(t_m) GIF(t_m) \Big/ \sum_{m=1}^{M} w(t_m) \quad (7)$$

where $w(t_M) = 1$; and $w(t_M) = e^{-i(t_M - t_m)}$.

The average run-time global impact factor may be computed according to Equation (7) for other types of alerts generated by the system. The different alerts may be ranked in descending order according to the average run-time global impact factors computed for each alert. A first alert with a larger average run-time global impact factor than an average run-time factor of a second alert is assigned a higher rank than the second alert. Higher ranked alerts may be assigned higher priority during troubleshooting.

Additional thresholds may be used to prioritize the global impact of the problem based on how close the global impact factor $GIF(t_a)$ is to the value one. The following thresholds between the global impact threshold $T_G$ and one may be used to assign priority levels to an alert as follows:

$$0 < T_G < T_1 < T_2 < T_3 < \quad (8)$$

where $T_1$, $T_1$, and $T_1$ are low, medium, and high priority thresholds, respectively.

When the following conditions is satisfied $$T_G \leq GIF(t_a) < T_1 \quad (9a)$$

the corresponding alert may be identified as having a low-priority global impact on the system. When the following conditions is satisfied $$T_1 \leq \mathrm{GIF}(t_a) < T_2 \quad (9b)$$

the corresponding alert may be identified as having a medium priority global impact on the system. When the following conditions is satisfied $$T_2 \leq \mathrm{GIF}(t_a) < T_3 \quad (9c)$$

the corresponding alert may be identified as having a high priority global impact on the system. When the following conditions is satisfied $$T_3 \leq \mathrm{GIF}(t_a) \leq 1 \quad (9d)$$

the corresponding alert may be identified as having the highest priority global impact on the system. A recommendation may be generated for each priority level. The priority levels and recommendations may be sent to and displayed on an administration computer system, enabling an IT administrator to respond. When the alert is identified as having the highest priority, the system may be automatically shut down or taken off line.

When the run-time global impact factor satisfies the following condition:

$$0 < \mathrm{GIF}(t_a) < T_G \quad (10)$$

the alert is identified as originated from a problem that has a local impact on the system. A local impact alert may be checked further in order to determine the type of local impact the problem is having on the system. Attributes of an alert are used to filter log field values of pre-alert event messages and post-alert event messages that may be used to identify the problem that generated the alert. The log field values may be "HTTP status codes," "SMTP reply codes," or custom non-parametric tokens written by the application program or operating system developer. The HTTP status codes may be included in certain event messages generated by the application programs, operating systems, and other event sources of a system. HTTP is a request-response protocol between a client and a server. The client and server may be on different computer systems or on the same computer system. For example, a web browser may be a client and an application running on a computer system in a distributed computing system hosting a website may be a server. The client submits an HTTP request message to the server. The server provides resources or performs other functions on behalf of the client in response to the request and returns an HTTP response message to the client. The first line of an HTTP response message to a request from a client or a server is called the status line which includes a numeric status code and a textual description of the status code. The HTTP response contains completion status information about the request and may also contain requested content in its message body. The HTTP status codes may be included in the event messages. Different combinations of HTTP status codes included in the event messages may be associated with different types of alerts.

Figure 19A:

FIG. 19A shows a table of HTTP status codes that may be used as log field values to determine the local impact of an alert. Column 1901 contains examples of HTTP status codes represented by three-digit numbers. Column 1902 list the associated brief textual description of the HTTP status codes listed in column 1901. HTTP status codes 2xx, where each x represents a positive integer refer to successful operations. For example, an HTTP status code "200" is used to represent a successful HTTP request. The HTTP status code 200 may be included in an event message generated as a result of completing the successful HTTP request. On the other hand, HTTP status codes 4xx present client errors and HTTP status codes 5xx represent server errors. When a client error occurs, the HTTP status codes 4xx that corresponds to the type of error created by the client are recorded in an event message. The value of the HTTP status codes recorded in the event message may be used to understand the type of error that has occurred at the client. For example, an event message that contains the HTTP status code "400" means that a request could not be understood by the server due to improper syntax in the request. When a server error occurs, the HTTP status codes 5xx that correspond to the type of error at the server are recorded in an event message. For example, an event message that contains the HTTP status code "502" means that the server, which serves as a gateway or proxy receiver, has received an invalid response from an upstream server computer.

The SMTP reply codes represent the status of messages sent according to a simple mail transfer protocol ("SMTP") for email controlled by an SMTP server. SMTP servers send messages from one computer to another in accordance with the SMTP. SMTP servers record the status of messages sent and problems that arise in sending messages between computers in event messages as SMTP reply codes.

FIG. 19B shows a table of SMTP reply codes that may be used as log field values generated by an SMTP server. Column 1903 contains examples of SMTP reply codes represented by three-digit numbers. Column 1904 list the associated brief textual description of the SMTP reply codes listed in column 1903. When an SMTP error, command, answer to a command occurs the corresponding reply code is recorded in an event log generated by the SMTP server.

When an alert has been identified as has having local impact, the relative frequency of the log field values associated with the alert definition are determined from the pre-alert and post-alert event messages. For example, one alert may have associated HTTP status codes 401 and 402 display in FIG. 19A. The relative frequencies of the HTTP status codes 401 and 402 are determined from the pre-alert and post-alert event messages. Another alert may have associated HTTP codes 500 and 510. The relative frequencies of the HTTP status codes 401 and 402 are determined from the pre-alert and post-alert event messages.

Figure 20:
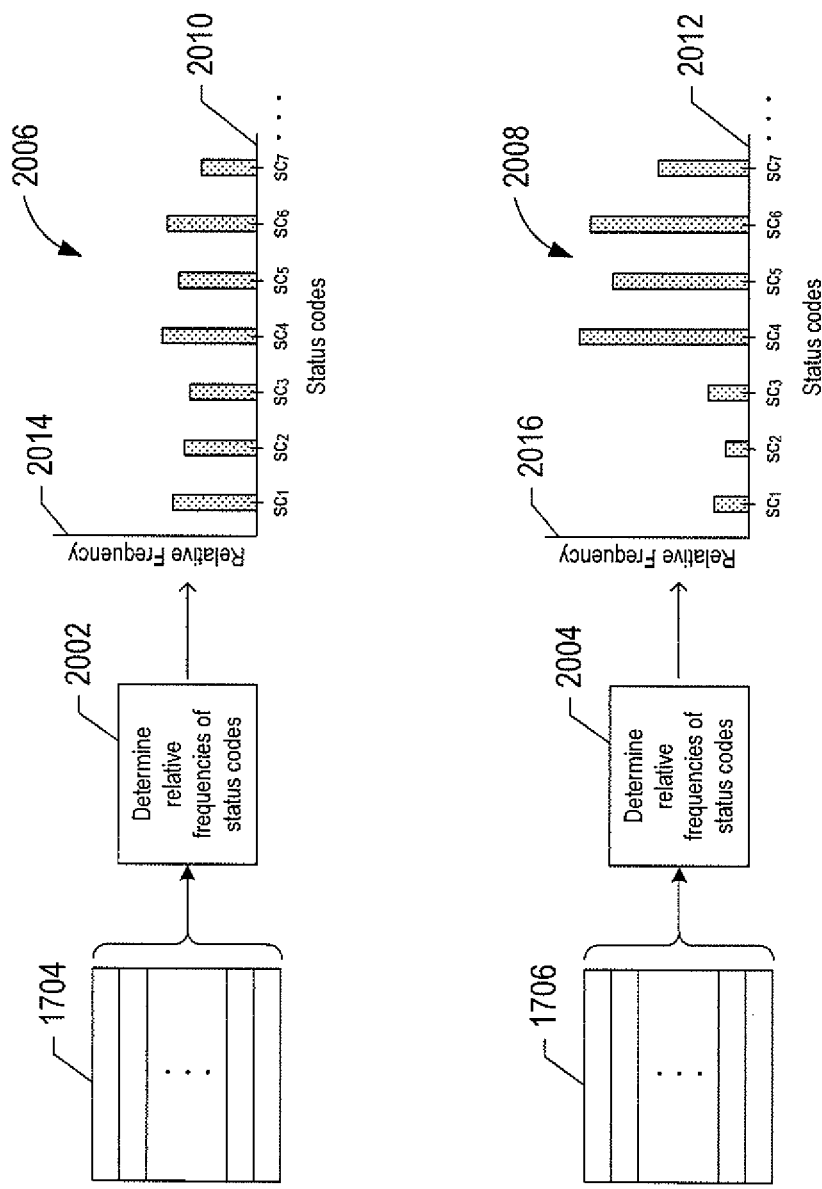
FIG. 20 shows an example of determining relative frequencies of HTTP status codes in pre-alert and post-alert event messages.

FIG. 20 shows an example of determining relative frequencies of log field values in the pre-alert event messages 1704 and the post-alert event messages 1706 described above. In block 2002, the relative frequencies of the log field values associated with the alert are determined. In block 2004, the relative frequencies of the log field values associated with the alert are determined. For each log field value of the pre-alert event messages 1704 associated with alert, the relative frequency is given by $$rf_k^{pre} = \frac{n_{pre}(sc_k)}{M_{pre}} \quad (11a)$$

where
  $n_{pre}(sc_k)$ is the number of times the log field value $sc_k$ appears in the pre-alert event messages; and
  $M_{pre}$ is the total number of log field values in pre-alert event messages.

For each log field value of the post-alert event messages 1706 associated with the alert, the relative frequency is given by $$rf_k^{post} = \frac{n_{post}(sc_k)}{M_{post}} \tag{11b}$$

where
$n_{post}(sc_k)$ is the number of times the log field value $sc_k$ appears in the post-alert event messages; and
$M_{post}$ is the total number of log field values in post-alert event messages.

FIG. 20 shows a histogram 2006 of a pre-alert log field value distribution and a histogram 2008 of a post-alert log field value distribution. Horizon-al axes 2010 and 2012 represent the log field values. The log field values are denoted by $sc_k$, where k a log field value index. Vertical axes 2014 and 2016 represent relative frequency ranges. Shaded bars represent the relative frequency of each log field value associated with the alert. Each bar represents a relative frequency of a log field value associated with the alert.

Methods also compute a run time local impact factor, denoted by $LIF(t_a)$, for the alert at time $t_a$ as a function of the pre-alert event-type distribution of event type frequencies and the post-alert event-type distribution of event type frequencies. In one implementation, a run-time local impact factor at the time $t_a$ of the alert may be computed using the Jensen-Shannon divergence as follows:

$$LIF_{JS}(t_a) = -\sum_{k=1}^{K} M_k \log M_k + \frac{1}{2}\left[\sum_{k=1}^{K} P_k \log P_k + \sum_{k=1}^{K} Q_k \log Q_k\right] \tag{12}$$

where $P_k = rf_k^{pre}$ $Q_k = rf_k^{post}$; and $M_k = (P_k + Q_k)/2$.

When the value of local impact factor is greater than a local impact threshold, $T_L < LIF_{JS}(t_a)$ the alert may be identified as having a local impact that requires attention during troubleshooting.

In other implementations, the local impact factor between pre-alert and post-alert event types distributions described above may be computed using:

$$LIF_{CS}(t_a) = 1 - \frac{2}{\pi}\cos^{-1}\left[\frac{\sum_{k=1}^{K} P_k Q_k}{\sqrt{\sum_{k=1}^{K}(P_k)^2}\sqrt{\sum_{k=1}^{K}(Q_k)^2}}\right] \tag{13}$$

The value of the local impact factor $LIF_{CS}(t_a)$ of Equation (13) is between zero and one with a value of zero indicating perfect overlap between pro-alert and post-alert event type distributions and a value of one indicating no overlap between distributions.

Alerts having a local impact on a system of a distributed computing system may be ranked in descending order according to associated local impact factors. Higher ranked alerts may be assigned a higher priority during troubleshooting and recommendations for addressing each alert may be generated. For example, $LIF_{JS}(\text{alert 1})$, $LIF_{JS}(\text{alert 2})$, and $LIF_{JS}(\text{alert 3})$ represent three different local impact factors computed for three different alerts generated for a system as described above. Suppose the descending order of the local impact factors is $LIF_{JS}(\text{alert 3}) > LIF_{JS}(\text{alert 1}) > LIF_{JS}(\text{alert 2})$ Alert 3 is assigned highest priority, alert 1 is assigned the next highest priority, and alert 2 is assigned the lowest priority. A recommendation may be generated for each priority level. A system administrator may use the priority level and recommendation to perform an appropriate response.

Alerts may also be ranked according to historical local impact on a system. Consider a set of historical local impact factors computed for the same alert generated M times in the past by a system:

$$\{LIF_{JS}(t_1), LIF_{JS}(t_2), \ldots, LIF_{JS}(t_M)\} \tag{14}$$

where $t_1, t_2, \ldots, t_M$ represent past alert times.

The average run-time local impact factor for the alert is computed as follows:

$$LIF_{AVE}(\text{alert}) = \sum_{m=1}^{M} w(t_m) LIF_{JS}(t_m) \bigg/ \sum_{m=1}^{M} w(t_m) \tag{15}$$

where $w(t_m) = 1$; and $w(t_m) = e^{-(t_M - t_m)}$.

The average run-time local impact factor may be computed according to Equation (15) for other types of alerts generated by the system. The different alerts may be ranked in descending order according to the average run-time global impact factors computed for each alert. A first alert with a larger average run-time local impact factor than an average run-time local impact factor of a second alert is assigned a higher rank than the second alert. Higher ranked alerts may be assigned higher priority during troubleshooting.

The method described below with reference to FIGS. 21-24 may be stored in one or more data-storage devices as machine-readable instructions that when executed by one or more processors of the computer system shown in FIG. 1 quantify and prioritize alerts in a computing system.

Figure 21:
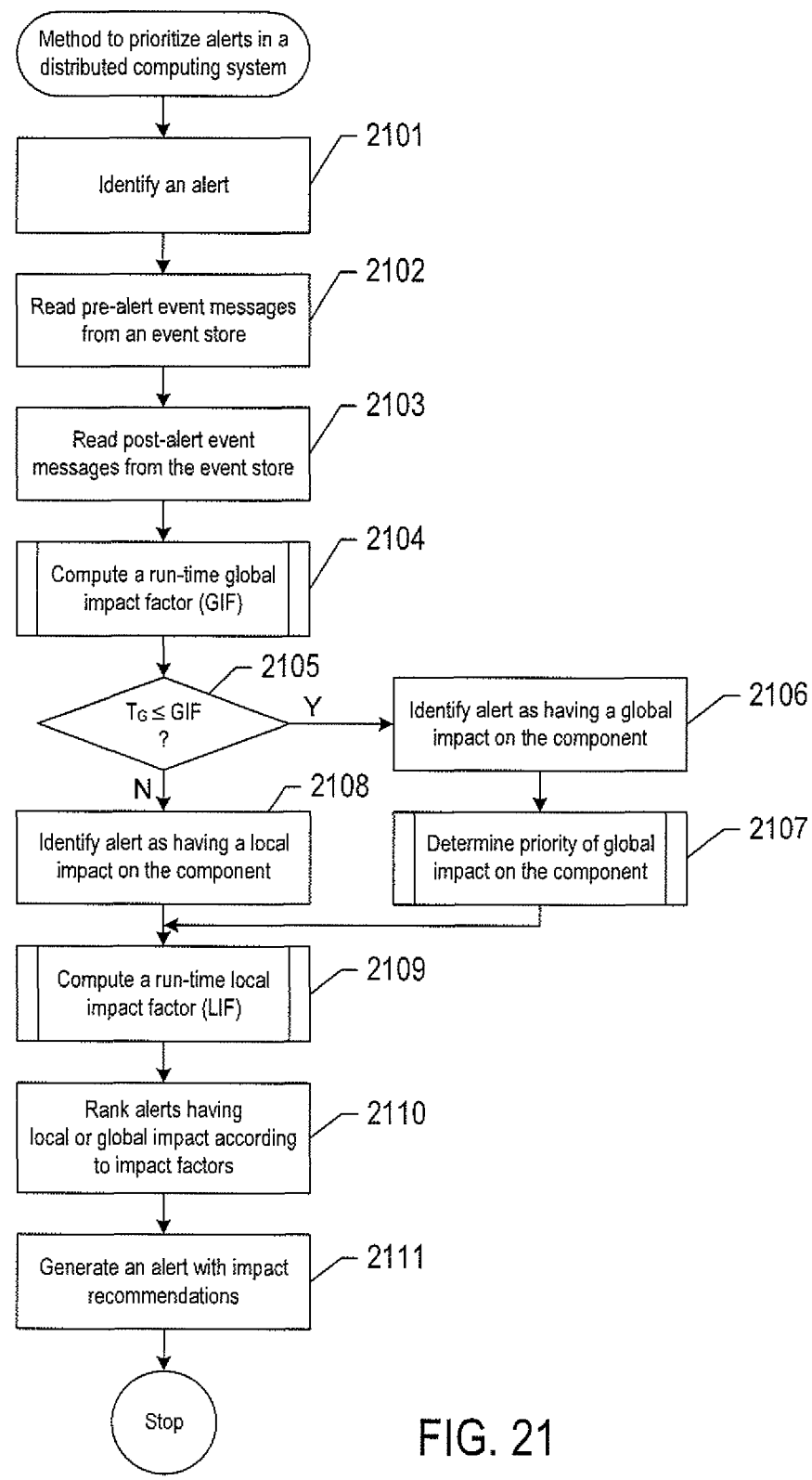
FIG. 21 shows a control-flow diagram of a computational method to prioritize alerts in a distributed computing system.

FIG. 21 shows a control-flow diagram of a computational method to prioritize alerts in a distributed computing system. In block 2101, an alert is identified. The alert may be an alert received from an IT operations monitoring tool that monitors physical and virtual resources of a system or the alert may be an alert trigger received from a log management tool that maintains a record of event messages generated by event sources of the system. In block 2102, event messages recorded in the event store before the alert are identified as pre-alert event messages, as described above with reference to FIGS. 16A-16B. In block 2103, event messages recorded in the event store after the alert are identified as post-alert event messages, as described above with reference to FIGS. 16A-16B. In block 2104, a routine "compute a run-time global impact factor (GIF)" is called. In decision block 2105, when the global impact factor is greater than a global threshold, control flows to block 2106. Otherwise, control flows to block 2108. In block 2106, the alert is identified as has having a global impact. In block 2107, a routine "determine priority of global impact on the system" is called. In block 2108, because the alert does not have a global impact, the alert is identified as having a local impact on the system. In block 2109, a routine "compute a run-time local impact factor (LIF)" is called. In block 2110, alerts are rank ordered according to the global or local impact factor computed in blocks 2104 and 2109. In block 2111, a priority is assigned to the alert and a recommendation for responding the problem is generated.

Figure 22:
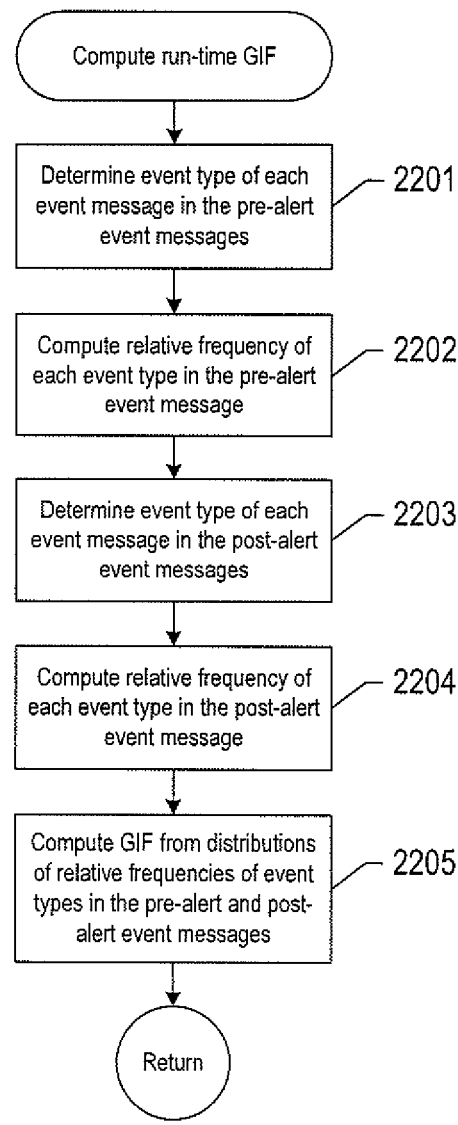
FIG. 22 shows control-flow diagram of the routing "compute run-time global impact factor" called in FIG. 21.

FIG. 22 shows control-flow diagram of the routing "compute run-time global impact factor" called in block 2104 of FIG. 21. In block 2201, event-type analysis is used to determine the event type of each event message in the pre-alert event messages as described above with reference to FIG. 18. In block 2202, relative frequencies of the event types may be computed as described above with reference to Equation (1a) and FIG. 17. In block 2203, event-type analysis is used to determine the event type of each event message in the post-alert event messages as described above with reference to FIG. 18. In block 2204, relative frequencies of the event types may be computed as described above with reference to Equation (1b) and FIG. 17. In block 2205, a global impact factor is computed from the distribution of relative frequencies of the event types in the pre-alert event message and the distribution of relative frequencies of the event types in the post-alert event message as described above with reference to Equation (2).

Figure 23:
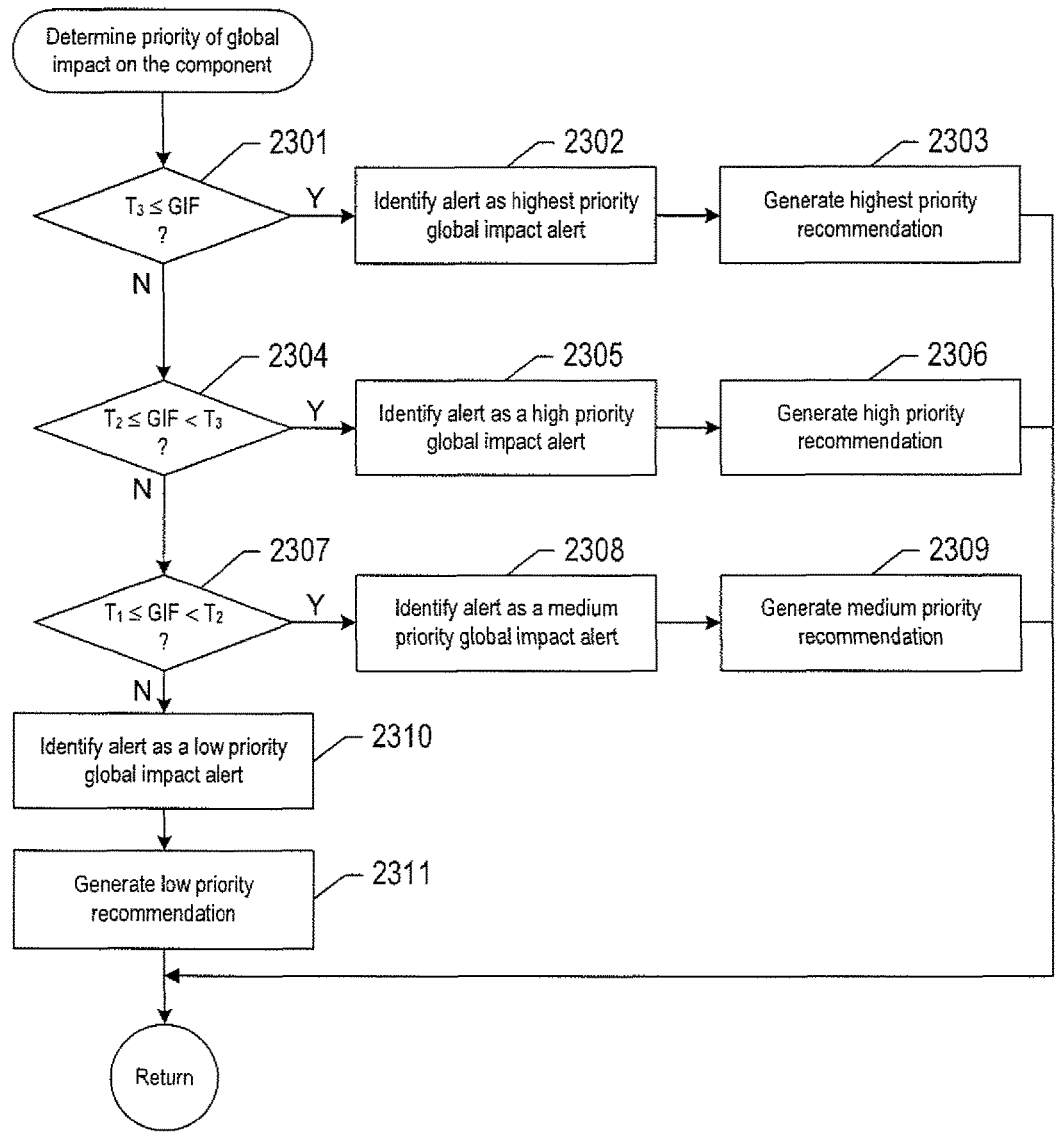
FIG. 23 shows a control-flow diagram of the routine "determine priority of global impact on system" called in FIG. 21.

FIG. 23 shows a control-flow diagram of the routine "determine priority of global impact on the system" called in block 2107 of FIG. 21. In decision block 2301, when the global impact factor satisfies the condition given by Equation (9d), control flows to block 2302. In block 2302, the alert is identified as a highest priority global impact alert. In block 2303, a recommendation for handling the highest priority alert is generated. In decision block 2304, when the global impact factor satisfies the condition given by Equation (9c), control flows to block 2305. In block 2305, the alert is identified as a high priority global impact alert. In block 2306, a recommendation for handling the high priority alert is generated. In decision block 2307, when the global impact factor satisfies the condition given by Equation (9b), control flows to block 2308. In block 2308, the alert is identified as a medium priority global impact alert. In block 2309, a recommendation for handling the medium priority alert is generated. In block 2310, the alert is identified as a low-priority global impact. In block 2311, a notice is generated that the alert is low priority.

Figure 24:
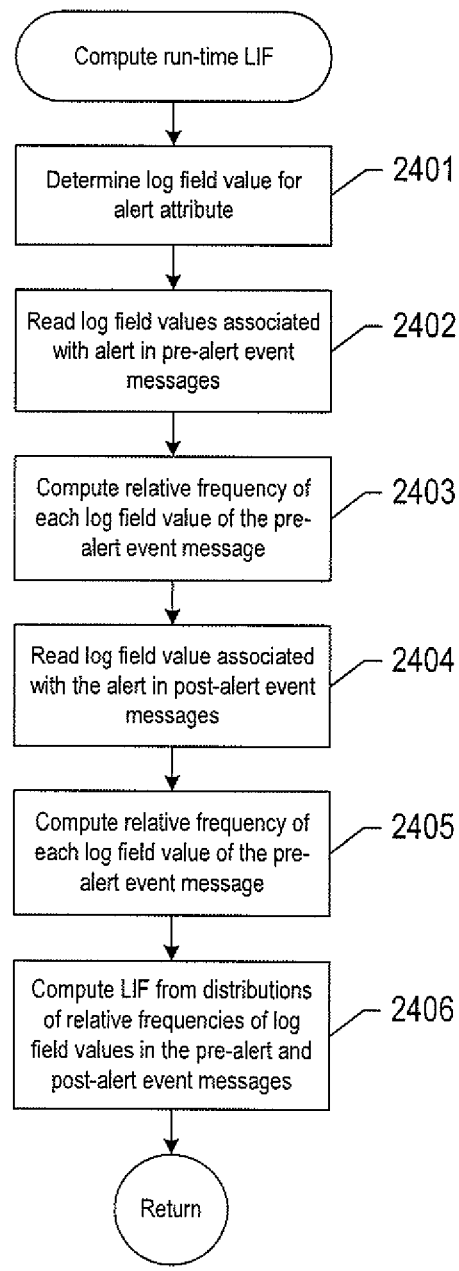
FIG. 24 shows a control-flow diagram of the routine "compute run-time local impact factor" called in FIG. 21.

FIG. 24 shows a control-flow diagram of the routine "compute run-time local impact factor" called in block 2109 of FIG. 21. In block 2401, log field values attributed to the alert are determined. In block 2402, log field values associated with the alert are read from the pre-alert event messages. In block 2403, relative frequencies of the log field values of the pre-alert event messages are computed as described above with reference to Equation (11a). In block 2404, log field values associated with the alert are read from the post-alert event messages. In block 2405, relative frequencies of the log field values of the post-alert event messages are computed as described above with reference to Equation (11b). In block 2406, a local impact factor is computed from the distribution of relative frequencies of the log field values in the pre-alert event message and the distribution of relative frequencies of the log field values in the post-alert event message as described above with reference to Equation (12).

Examples

Figure 26:
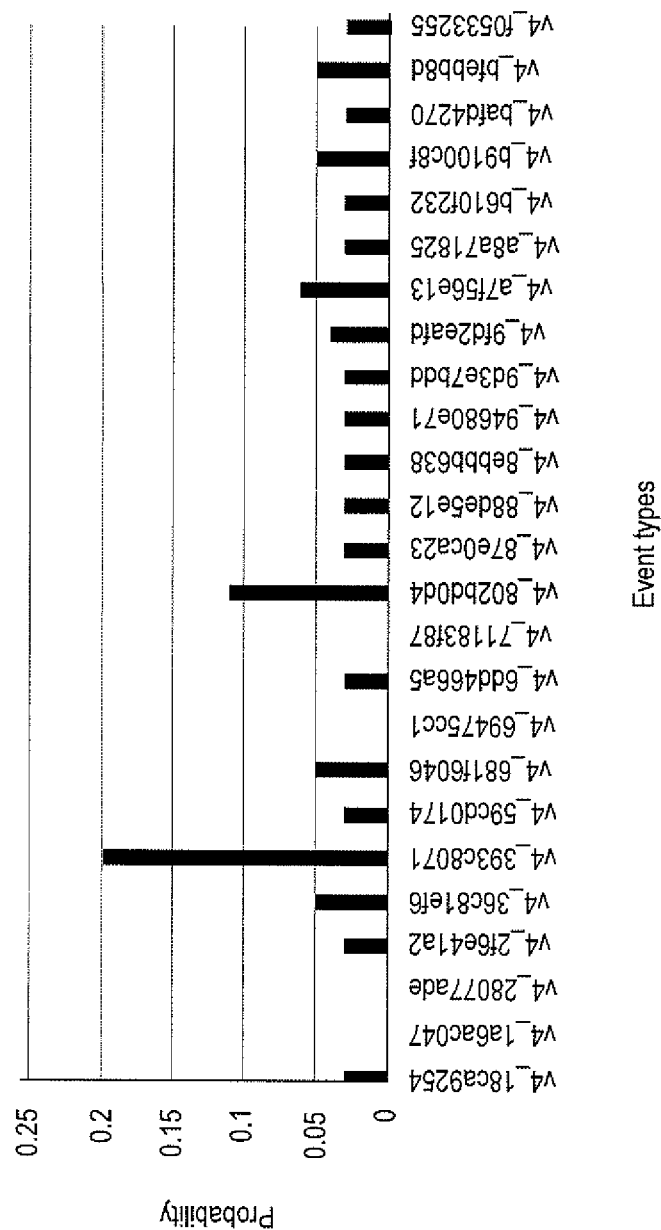
Figure 28:
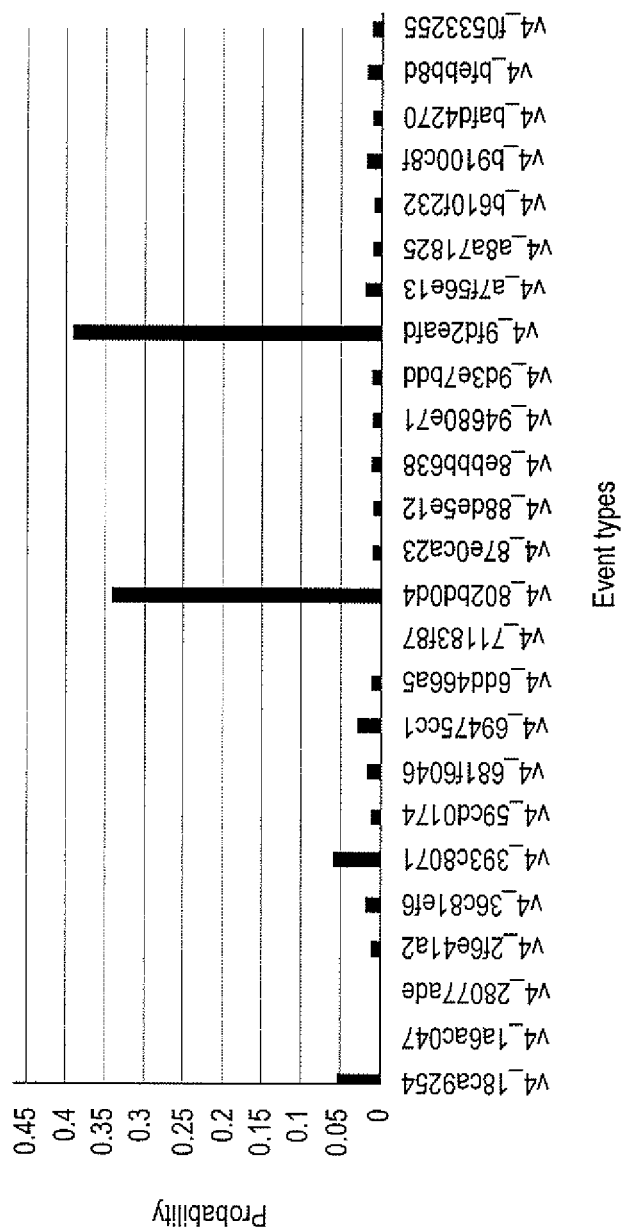

FIGS. 25-28 show an example of event type distributions of pre-alert and post-alert event messages that change as a result of a simulated distributed dial of service ("DDOS") attack on a server. The DDOS generates an alert when there is spike in the number of event messages generated by the system. FIGS. 25-28 illustrate how this anomaly impacted the environment for the pre-alert and post-alert time ranges of the alert time. The table shown in FIG. 25 displays counts, percentages, and probabilities (i.e., relative frequencies) of the event types before the alert. FIG. 26 shows a plot of the probabilities displayed in the table shown in FIG. 26. The table shown in FIG. 27 displays probabilities (i.e., relative frequency) of the same event types after the alert. FIG. 28 shows a plot of the probabilities displayed in the table shown in FIG. 27. FIGS. 25-28 reveal that before the DDOS attack on the server, the difference between event type distributions was negligible, but after the alert, on unusually high volume of log messages were generated. The global impact was calculated to be 0.307, which implies a global impact on the system.

FIG. 29 shows relative frequency distributions of HTTP status code obtained from pre-alert and post-alert event messages. In this example, a local impact alert indicates a security issue at a web service. The field data considered for this type of alert comprises HTTP status codes 20x, 30x, 401, and 404. Occurrences of the HTTP status codes 20x, 30x, 401, and 404 in the pre-alert and post-alert event messages and corresponding relative frequencies (i.e., probabilities) are displayed in the table shown in FIG. 29. The local impact factor of Equation (12) is 0.316, which is a large shift when compared to two consecutive normal operations patterns obtained before the alert.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method stored in one or more data-storage devices and executed using one or more processors of a computing environment to prioritize alerts generated by management tools that monitor a computing system, the method comprising:

reading pre-alert event messages from an event store, the pre-alert event messages generated by one or more event sources of the system before triggering an alert indicating a change to the system;

reading post-alert event messages from the event store, the post-alert event messages generated by the one or more event sources after triggering the alert;

computing an impact factor that provides a quantitative measure of the change to the system based on the pre-alert event messages and the post-alert event messages;

determining a rank for the alert based on a comparison between the impact factor with impact factors of other alerts generated for the system; and generating a recommendation for responding to the alert based on the rank of the alert.

2. The method of claim 1, wherein reading pre-alert event messages and reading post-alert event messages comprises:

reading event messages of the event store with time stamps that occur in a pre-alert time interval that ends at a time when the alert is generated; and reading event message of the event store with time stamps that occur in a post-alert time interval that begins at a time when the alert is generated.

3. The method of claim 1, wherein reading pre-alert event messages and reading post-alert event messages comprises:

determining a time of an alert trigger in the pre-alert event messages;

reading event messages of the event store with time stamps that occur in a pre-alert time interval that ends at the time of the alert trigger; and reading event message of the event store with time stamps that occur in a post-alert time interval that begins at the time of the alert trigger.

4. The method of claim 1, wherein computing the impact factor comprises:

computing a global impact factor based on the pre-alert event messages and the post-alert event messages;

setting the impact factor equal to the global impact factor when the global impact factor is greater than a global impact threshold;

computing a local impact factor based on the pre-alert event messages and the post-alert event messages when the global impact factor is less than the global impact threshold; and setting the impact factor equal to the local impact factor.

5. The method of claim 4, wherein computing the global impact factor comprises:

determining an event type of each event message in the pre-alert event messages;

computing relative frequency of each event type in the pre-alert event messages;

forming a pre-alert event type distribution from the relative frequencies of the event types in the pre-alert event messages;

determining an event type of each event message in the post-alert event messages;

computing relative frequency of each event type in the post-alert event messages;

forming a post-alert event type distribution from the relative frequencies of the event types in the post-alert event messages; and computing a global impact factor from the pre-alert event type distribution and the post-event type distribution.

6. The method of claim 4, wherein computing the local impact factor comprises:

determining log field values based on a definition of the alert;

computing relative frequencies of the log field values in event message in the pre-alert event messages;

forming a pre-alert distribution of the relative frequencies of the log field values in the pre-alert event messages;

computing relative frequencies of the log field values in event message in the post-alert event messages;

forming a post-alert distribution of the relative frequencies of the log field values in the post-alert event messages; and computing a local impact factor from the pre-alert and post-alert distributions.

7. The method of claim 1, wherein determining the rank for the alert based on the impact factor comprises rank ordering the alert with other alerts generated by the system in descending order of the impact factor associated with the alert and the impact factors associated with the other alerts.

8. A computer system that prioritizes alerts indicating changes to a system, the computer system comprising:

one or more processors;

one or more data-storage devices; and machine-readable instructions stored in the one or more data-storage devices that when executed uses the one or more processors to perform operations comprising:

reading pre-alert event messages from an event store, the pre-alert event messages generated by one or more event sources of the system before triggering an alert indicating a change to the system;

reading post-alert event messages from the event store, the post-alert event messages generated by the one or more event sources after triggering the alert;

computing an impact factor that provides a quantitative measure of the change to the system based on the pre-alert event messages and the post-alert event messages;

determining a rank for the alert based on a comparison between the impact factor with impact factors of other alerts generated for the system; and generating a recommendation for responding to the alert based on the rank of the alert.

9. The computer system of claim 8, wherein reading pre-alert event messages and reading post-alert event messages comprises:

reading event messages of the event store with time stamps that occur in a pre-alert time interval that ends at a time when the alert is generated; and reading event message of the event store with time stamps that occur in a post-alert time interval that begins at a time when the alert is generated.

10. The computer system of claim 8, wherein reading pre-alert event messages and reading post-alert event messages comprises:

determining a time of an alert trigger in the pre-alert event messages;

reading event messages of the event store with time stamps that occur in a pre-alert time interval that ends at the time of the alert trigger; and reading event message of the event store with time stamps that occur in a post-alert time interval that begins at the time of the alert trigger.

11. The computer system of claim 8, wherein computing the impact factor comprises:

computing a global impact factor based on the pre-alert event messages and the post-alert event messages;

setting the impact factor equal to the global impact factor when the global impact factor is greater than a global impact threshold;

computing a local impact factor based on the pre-alert event messages and the post-alert event messages when the global impact factor is less than the global impact threshold; and setting the impact factor equal to the local impact factor.

12. The computer system of claim 11, wherein computing the global impact factor comprises:

determining an event type of each event message in the pre-alert event messages;

computing relative frequency of each event type in the pre-alert event messages;

forming a pre-alert event type distribution from the relative frequencies of the event types in the pre-alert event messages;

determining an event type of each event message in the post-alert event messages;

computing relative frequency of each event type in the post-alert event messages;

forming a post-alert event type distribution from the relative frequencies of the event types in the post-alert event messages; and computing a global impact factor from the pre-alert event type distribution and the post-event type distribution.

13. The computer system of claim 11, wherein computing the local impact factor comprises:

determining log field values based on a definition of the alert;

computing relative frequencies of the log field values in event message in the pre-alert event messages;

forming a pre-alert distribution of the relative frequencies of the log field values in the pre-alert event messages;

computing relative frequencies of the log field values in event message in the post-alert event messages;

forming a post-alert distribution of the relative frequencies of the log field values in the post-alert event messages; and computing a local impact factor from the pre-alert and post-alert distributions.

14. The computer system of claim 8, wherein determining the rank for the alert based on the impact factor comprises rank ordering the alert with other alerts generated by the system in descending order of the impact factor associated with the alert and the impact factors associated with the other alerts.

15. A non-transitory computer-readable medium encoded with machine-readable instructions that implement a method carried out by one or more processors of a computer system to perform the operations reading pre-alert event messages from an event store, the pre-alert event messages generated by one or more event sources of the system before triggering an alert indicating a change to the system;

reading post-alert event messages from the event store, the post-alert event messages generated by the one or more event sources after triggering the alert;

computing an impact factor that provides a quantitative measure of the change to the system based on the pre-alert event messages and the post-alert event messages;

determining a rank for the alert based on a comparison between the impact factor with impact factors of other alerts generated for the system; and generating a recommendation for responding to the alert based on the rank of the alert.

16. The computer-readable medium of claim 15, wherein reading pre-alert event messages and reading post-alert event messages comprises:

reading event messages of the event store with time stamps that occur in a pre-alert time interval that ends at a time when the alert is generated; and reading event message of the event store with time stamps that occur in a post-alert time interval that begins at a time when the alert is generated.

17. The computer-readable medium of claim 15, wherein reading pre-alert event messages and reading post-alert event messages comprises:

determining a time of an alert trigger in the pre-alert event messages;

reading event messages of the event store with time stamps that occur in a pre-alert time interval that ends at the time of the alert trigger; and reading event message of the event store with time stamps that occur in a post-alert time interval that begins at the time of the alert trigger.

18. The computer-readable medium of claim 15, wherein computing the impact factor comprises:

computing a global impact factor based on the pre-alert event messages and the post-alert event messages;

setting the impact factor equal to the global impact factor when the global impact factor is greater than a global impact threshold;

computing a local impact factor based on the pre-alert event messages and the post-alert event messages when the global impact factor is less than the global impact threshold; and setting the impact factor equal to the local impact factor.

19. The computer-readable medium of claim 18, wherein computing the global impact factor comprises:

determining an event type of each event message in the pre-alert event messages;

computing relative frequency of each event type in the pre-alert event messages;

forming a pre-alert event type distribution from the relative frequencies of the event types in the pre-alert event messages;

determining an event type of each event message in the post-alert event messages;

computing relative frequency of each event type in the post-alert event messages;

forming a post-alert event type distribution from the relative frequencies of the event types in the post-alert event messages; and computing a global impact factor from the pre-alert event type distribution and the post-event type distribution.

20. The computer-readable medium of claim 18, wherein computing the local impact factor comprises:

determining log field values based on a definition of the alert;

computing relative frequencies of the log field values in event message in the pre-alert event messages;

forming a pre-alert distribution of the relative frequencies of the log field values in the pre-alert event messages;

computing relative frequencies of the log field values in event message in the post-alert event messages;

forming a post-alert distribution of the relative frequencies of the log field values in the post-alert event messages; and computing a local impact factor from the pre-alert and post-alert distributions.

21. The computer-readable medium of claim 15, wherein determining the rank for the alert based on the impact factor comprises rank ordering the alert with other alerts generated by the system in descending order of the impact factor associated with the alert and the impact factors associated with the other alerts.

* * * * *